(12) United States Patent
Holcomb et al.

(10) Patent No.: US 10,531,117 B2
(45) Date of Patent: *Jan. 7, 2020

(54) SUB-BLOCK TRANSFORM CODING OF PREDICTION RESIDUALS

(71) Applicant: Microsoft Technology Licensing, LLC, Redmond, WA (US)

(72) Inventors: Thomas W. Holcomb, Bothell, WA (US); Chih-Lung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,156

(22) Filed: Nov. 20, 2018

(65) Prior Publication Data

US 2019/0089978 A1    Mar. 21, 2019

Related U.S. Application Data

(60) Continuation of application No. 15/246,237, filed on Aug. 24, 2016, now Pat. No. 10,158,879, which is a
(Continued)

(51) Int. Cl.
*H04N 11/02* (2006.01)
*H04N 19/523* (2014.01)
(Continued)

(52) U.S. Cl.
CPC ............. *H04N 19/523* (2014.11); *G06T 3/40* (2013.01); *G06T 7/0012* (2013.01);
(Continued)

(58) Field of Classification Search
CPC ... H04N 19/136; H04N 19/176; H04N 19/523
See application file for complete search history.

(56) References Cited

U.S. PATENT DOCUMENTS 6,650,708 B1 * 11/2003 Ohgose ............... H04N 19/105
375/240.16
7,203,234 B1    4/2007 Zeng
(Continued)

OTHER PUBLICATIONS

NPL: H.263 Video coding for low bit rate communication; Feb. 1998; (Year: 1998).*
(Continued)

*Primary Examiner* — Luis Perez-Fuentes
(74) *Attorney, Agent, or Firm* — Klarquist Sparkman, LLP

(57) ABSTRACT

Techniques and tools for sub-block transform coding are described. For example, a video encoder adaptively switches between 8×8, 8×4, and 4×8 DCTs when encoding 8×8 prediction residual blocks; a corresponding video decoder switches between 8×8, 8×4, and 4×8 inverse DCTs during decoding. The video encoder may determine the transform sizes as well as switching levels (e.g., frame, macroblock, or block) in a closed loop evaluation of the different transform sizes and switching levels. The encoder and decoder may use different scan patterns for different transform sizes when scanning values from two-dimensional blocks into one-dimensional arrays, or vice versa. The encoder and decoder may use sub-block pattern codes to indicate the presence or absence of information for the sub-blocks of particular blocks.

20 Claims, 25 Drawing Sheets

Related U.S. Application Data continuation of application No. 14/337,578, filed on Jul. 22, 2014, now Pat. No. 9,456,216, which is a continuation of application No. 11/890,059, filed on Aug. 3, 2007, now Pat. No. 8,817,868, which is a division of application No. 10/322,352, filed on Dec. 17, 2002, now Pat. No. 7,266,149.

(60) Provisional application No. 60/341,674, filed on Dec. 17, 2001.

(51) Int. Cl.

| | | |
|---|---|---|
| *G06T 3/40* | (2006.01) | |
| *G06T 7/00* | (2017.01) | |
| *H04N 19/105* | (2014.01) | |
| *H04N 19/52* | (2014.01) | |
| *H04N 19/176* | (2014.01) | |
| *H04N 19/70* | (2014.01) | |
| *H04N 19/119* | (2014.01) | |
| *H04N 19/147* | (2014.01) | |
| *H04N 19/172* | (2014.01) | |
| *H04N 19/46* | (2014.01) | |
| *H04N 19/63* | (2014.01) | |
| *H04N 19/122* | (2014.01) | |
| *H04N 19/129* | (2014.01) | |
| *H04N 19/61* | (2014.01) | |
| *H04N 19/593* | (2014.01) | |
| *H04N 19/117* | (2014.01) | |
| *H04N 19/132* | (2014.01) | |
| *H04N 19/146* | (2014.01) | |
| *H04N 19/80* | (2014.01) | |
| *H04N 19/82* | (2014.01) | |
| *H04N 19/547* | (2014.01) | |
| *H04N 19/57* | (2014.01) | |
| *H04N 19/86* | (2014.01) | |
| *H04N 19/895* | (2014.01) | |
| *H04N 19/50* | (2014.01) | |
| *H04N 19/527* | (2014.01) | |
| *H04N 19/533* | (2014.01) | |
| *H04N 19/59* | (2014.01) | |
| *H04N 19/136* | (2014.01) | |
| *H04N 19/18* | (2014.01) | |
| *H04N 19/513* | (2014.01) | |
| *H04N 19/115* | (2014.01) | |
| *H04N 19/137* | (2014.01) | |
| *H04N 19/625* | (2014.01) | |
| *H04N 19/154* | (2014.01) | |
| *H04N 19/124* | (2014.01) | |
| *H04N 19/15* | (2014.01) | |
| *H04N 19/182* | (2014.01) | |

(52) U.S. Cl.
CPC ......... *H04N 19/105* (2014.11); *H04N 19/115* (2014.11); *H04N 19/117* (2014.11); *H04N 19/119* (2014.11); *H04N 19/122* (2014.11); *H04N 19/124* (2014.11); *H04N 19/129* (2014.11); *H04N 19/132* (2014.11); *H04N 19/136* (2014.11); *H04N 19/137* (2014.11); *H04N 19/146* (2014.11); *H04N 19/147* (2014.11); *H04N 19/15* (2014.11); *H04N 19/154* (2014.11); *H04N 19/172* (2014.11); *H04N 19/176* (2014.11); *H04N 19/18* (2014.11); *H04N 19/46* (2014.11); *H04N 19/50* (2014.11); *H04N 19/513* (2014.11); *H04N 19/52* (2014.11); *H04N 19/527* (2014.11); *H04N 19/533* (2014.11); *H04N 19/547* (2014.11); *H04N 19/57* (2014.11); *H04N 19/59* (2014.11); *H04N 19/593* (2014.11); *H04N 19/61* (2014.11); *H04N 19/625* (2014.11); *H04N 19/63* (2014.11); *H04N 19/70* (2014.11); *H04N 19/80* (2014.11); *H04N 19/82* (2014.11); *H04N 19/86* (2014.11); *H04N 19/895* (2014.11); *H04N 19/182* (2014.11)

(56) References Cited

U.S. PATENT DOCUMENTS

| | | | |
|---|---|---|---|
| 8,094,711 B2* | 1/2012 | Tourapis | H04N 19/46 |
| | | | 375/240.01 |
| 8,190,232 B2 | 5/2012 | Zhang et al. | |
| 8,687,709 B2 | 4/2014 | Hsu et al. | |
| 8,817,868 B2* | 8/2014 | Holcomb | H04N 19/136 |
| | | | 375/240 |
| 9,456,216 B2* | 9/2016 | Holcomb | H04N 19/136 |
| 10,075,731 B2* | 9/2018 | Srinivasan | H04N 19/136 |
| 10,123,038 B2 | 11/2018 | Hsu et al. | |
| 10,158,879 B2* | 12/2018 | Holcomb | H04N 19/136 |
| 2003/0138150 A1 | 7/2003 | Srinivasan | |
| 2003/0138160 A1 | 7/2003 | Ishikawa et al. | |
| 2004/0146210 A1 | 7/2004 | Kalevo et al. | |
| 2016/0366443 A1* | 12/2016 | Holcomb | H04N 19/136 |

OTHER PUBLICATIONS

NPL: Coding of audio-visual objects—Visual; 1998; (Year: 1998).*
H.263—Video coding for low bit rate communication; Feb. 1998; (Year: 1998).*
Coding of audio-visual objects—Visual; 1998; (Year: 1998).*
NPL internet search; 2019; (Year: 2019).*
Lappalainen et al., "Optimized Implementations of Emerging H.26L Video Decoder on Pentium III," *Journal VLSI Signal Processing Systems for Signal, Image and Video Technology*, vol. 34, pp. 239-249 (Jul. 2003).
Notice of Allowance dated Apr. 12, 2019, from U.S. Appl. No. 16/177,860, 8 pp.
NPL Internet Search dated Apr. 8, 2019, 2 pp.
Office Action dated Feb. 5, 2019, from U.S. Appl. No. 16/177,860, 10 pp.

* cited by examiner

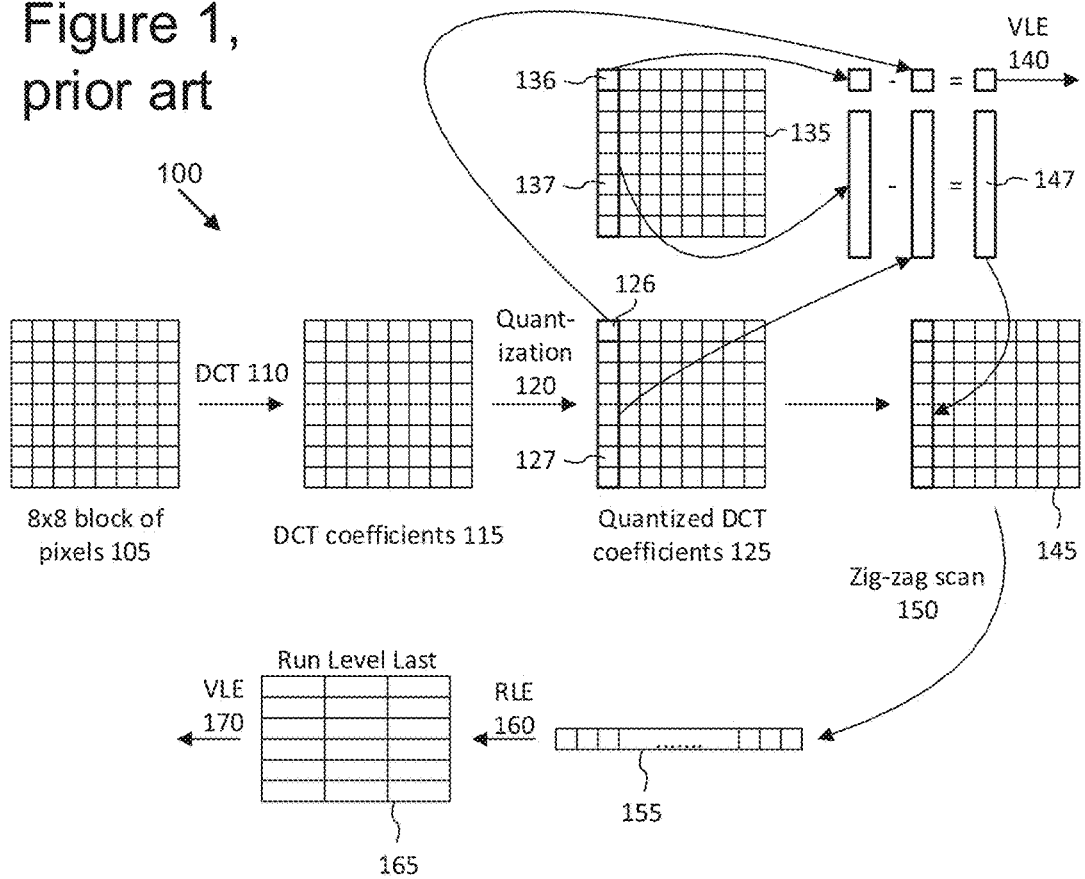
Figure 1, prior art
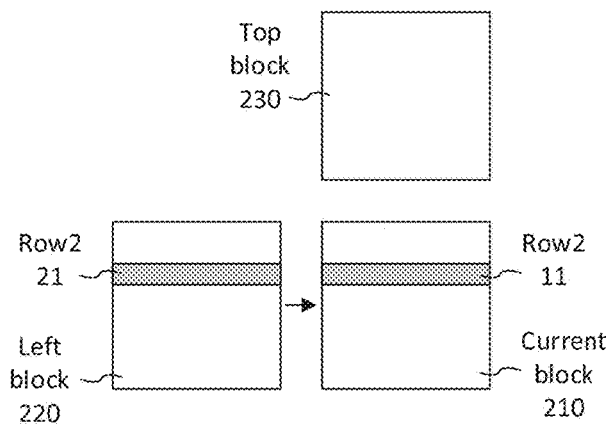
Figure 2, prior art

Figure 3, prior art
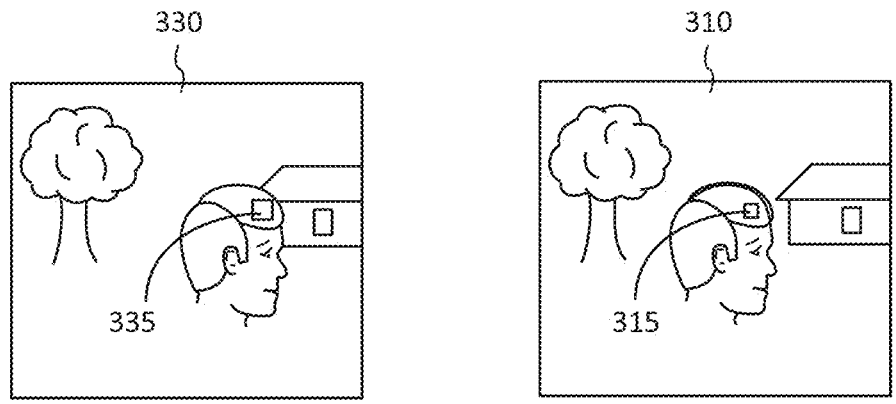
Figure 6
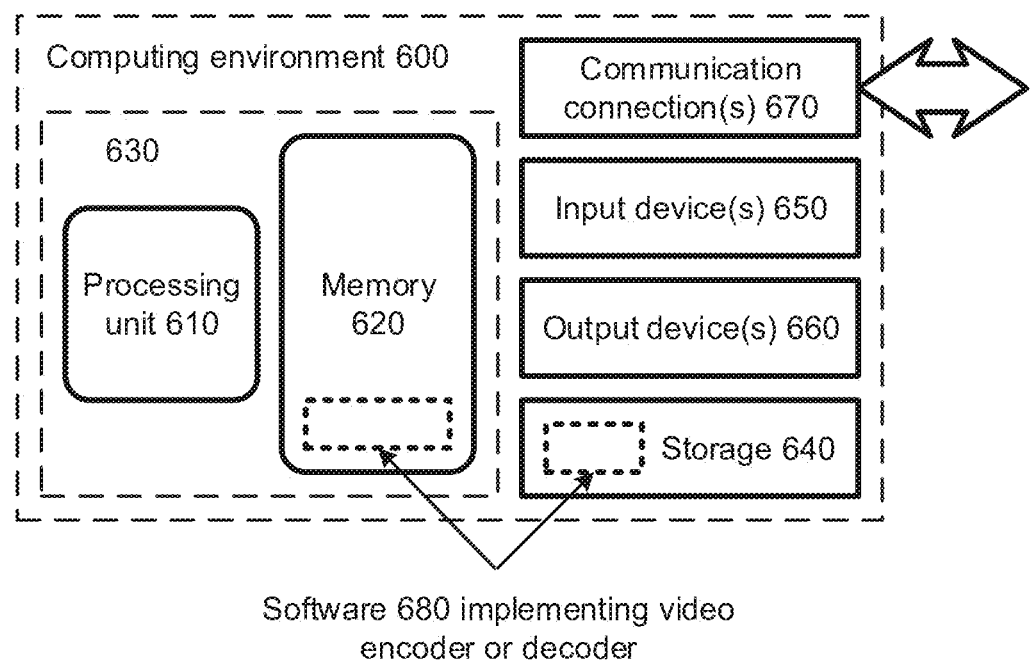
Software 680 implementing video
encoder or decoder

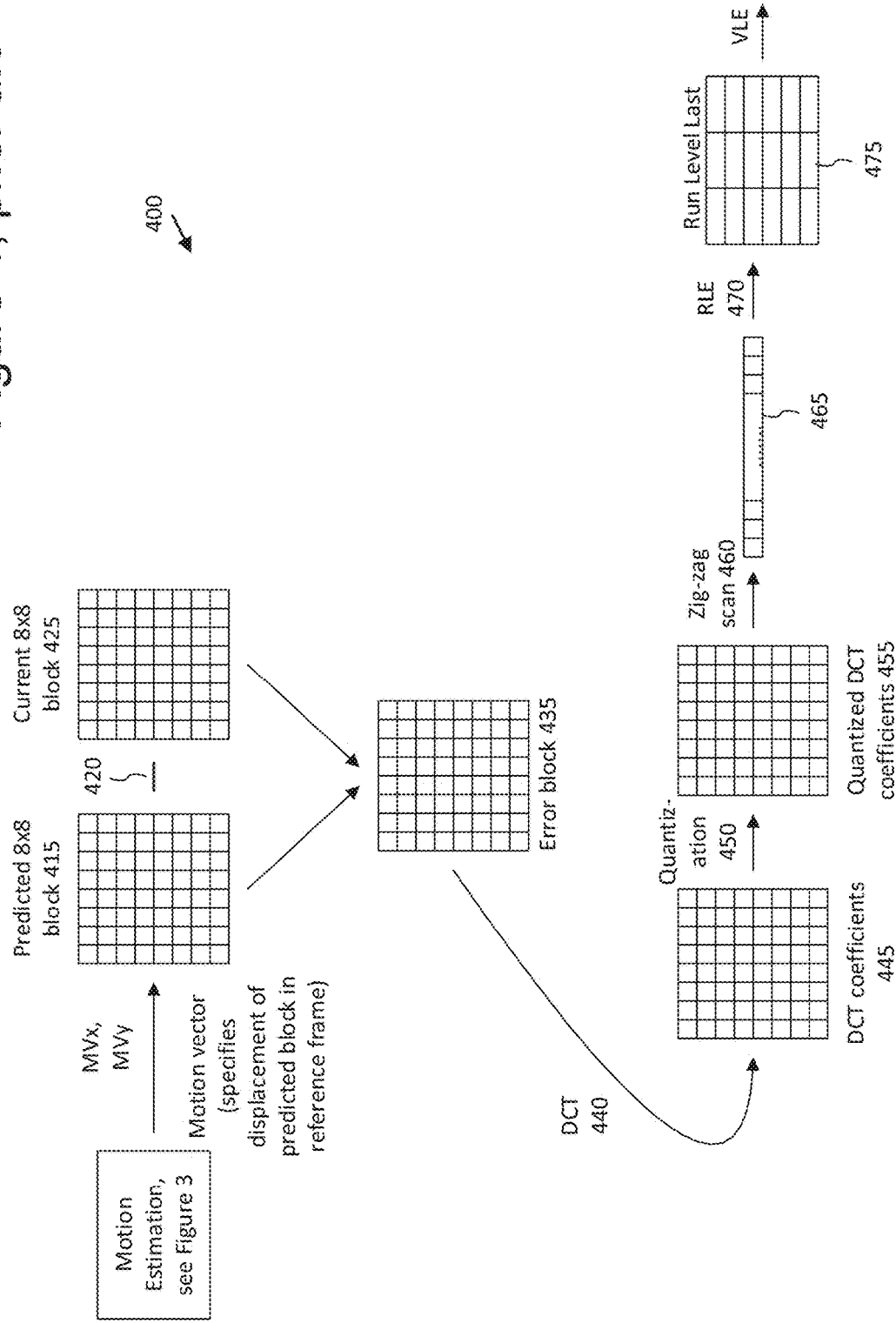
Figure 4, prior art

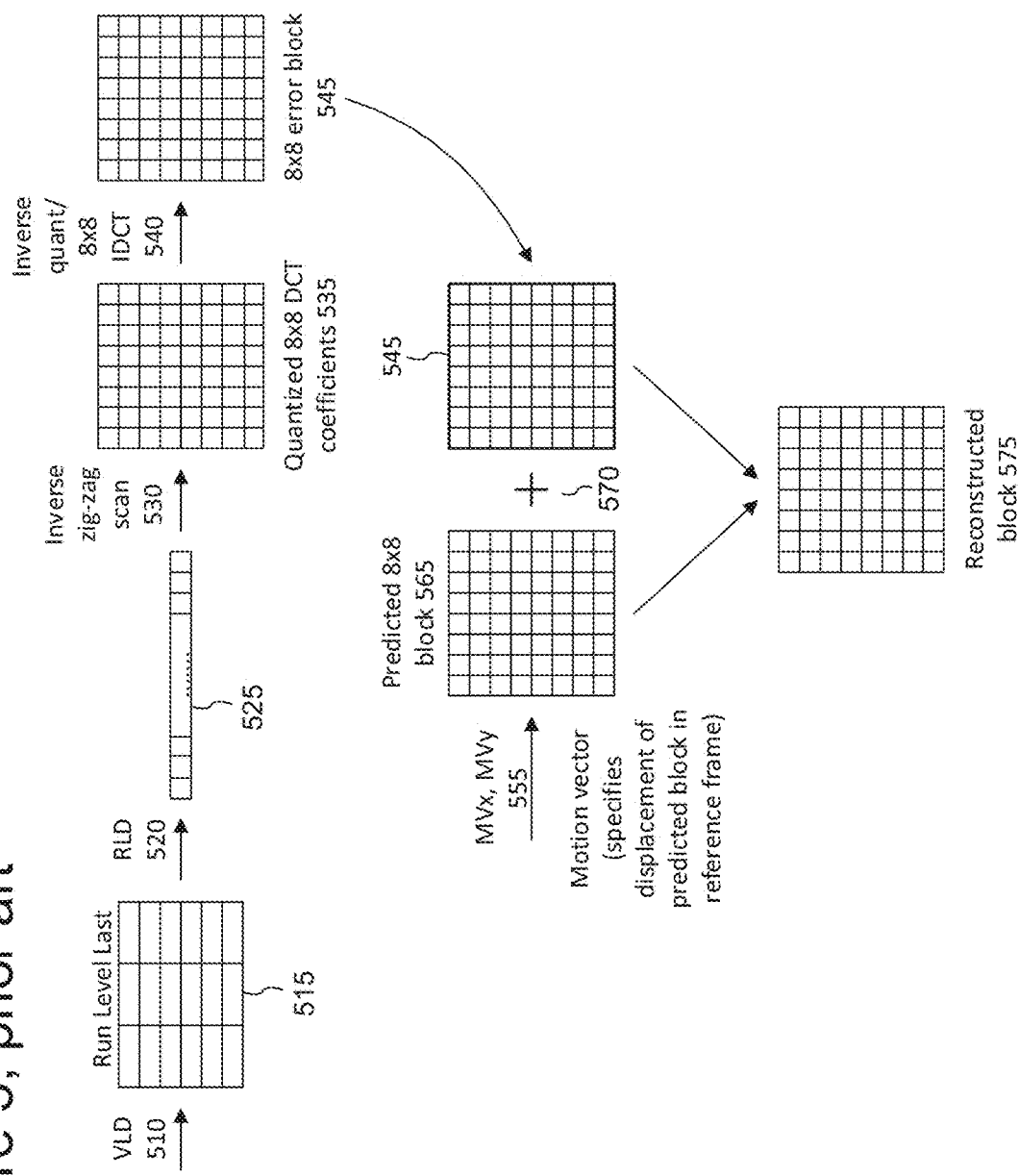
Figure 5, prior art

Figure 11a

```
/* The following data types are defined in the IDCT code:
I16 = 16 bit signed integer
I32 = 32 bit signed integer */
/* The following integer constants are used in the IDCT code */
W1 = 2841
W2 = 2676
W3 = 2408
W5 = 1609
W6 = 1108
W7 = 565
W1a = 1892
W2a = 1448
W3a = 784

RowIDCT_8Point (I16* input, I16* output)
{
    I32 x0, x1, x2, x3, x4, x5, x6, x7, x8;

x0 = ((I32) input [0] << 11) + 128;
    x1 = (I32) input [4] << 11;
    x2 = input [6];
    x3 = input [2];
    x4 = input [1];
    x5 = input [7];
    x6 = input [5];
    x7 = input [3];

/* first stage */
    x8 = W7 * (x4 + x5);
    x4 = x8 + (W1 - W7) * x4;
    x5 = x8 - (W1 + W7) * x5;
    x8 = W3 * (x6 + x7);
    x6 = x8 - (W3 - W5) * x6;
    x7 = x8 - (W3 + W5) * x7;

/* second stage */
    x8 = x0 + x1;
    x0 = x0 - x1;
    x1 = W6 * (x3 + x2);
    x2 = x1 - (W2 + W6) * x2;
    x3 = x1 + (W2 - W6) * x3;
    x1 = x4 + x6;
    x4 = x4 - x6;
    x6 = x5 + x7;
    x5 = x5 - x7;
```

—1100

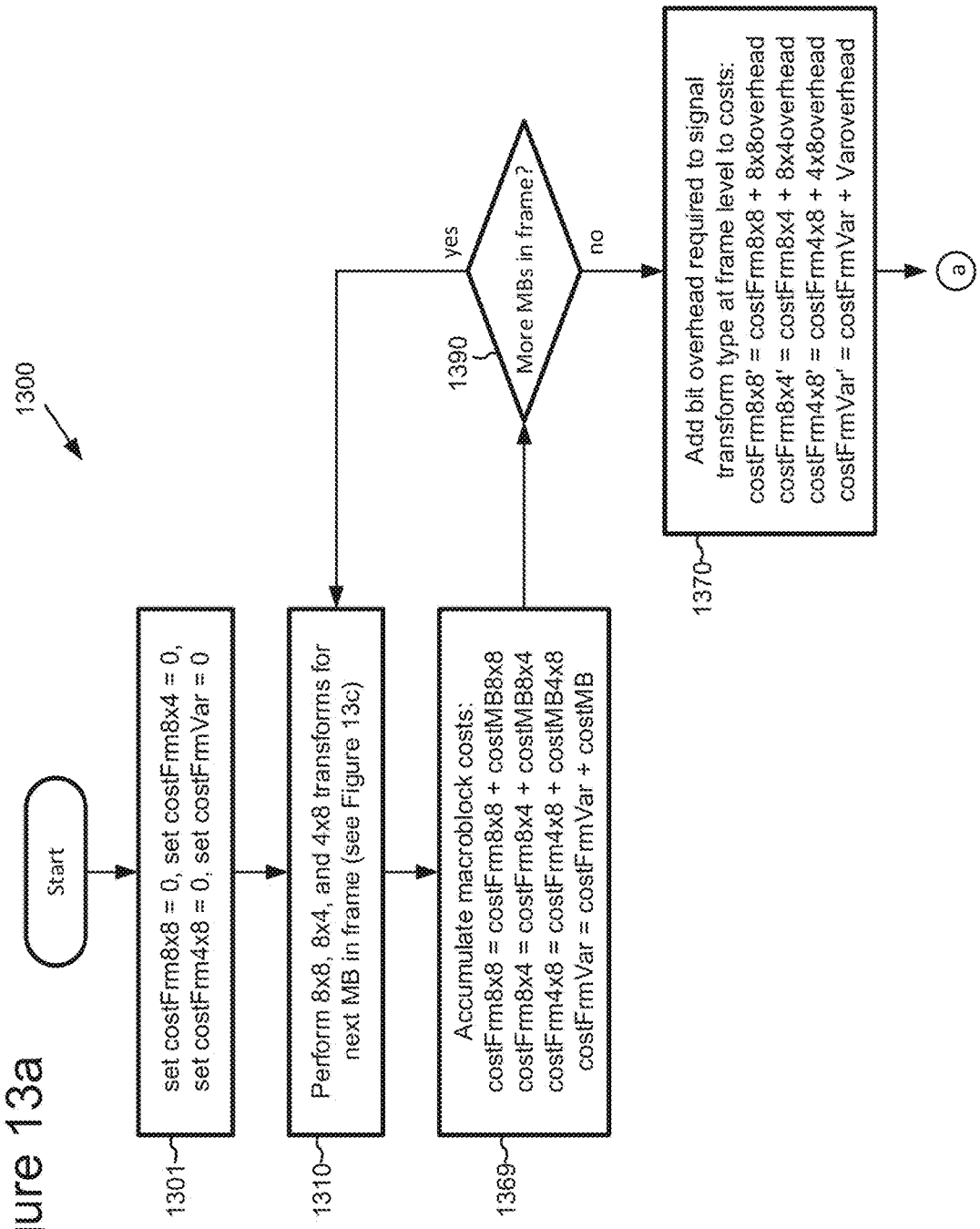

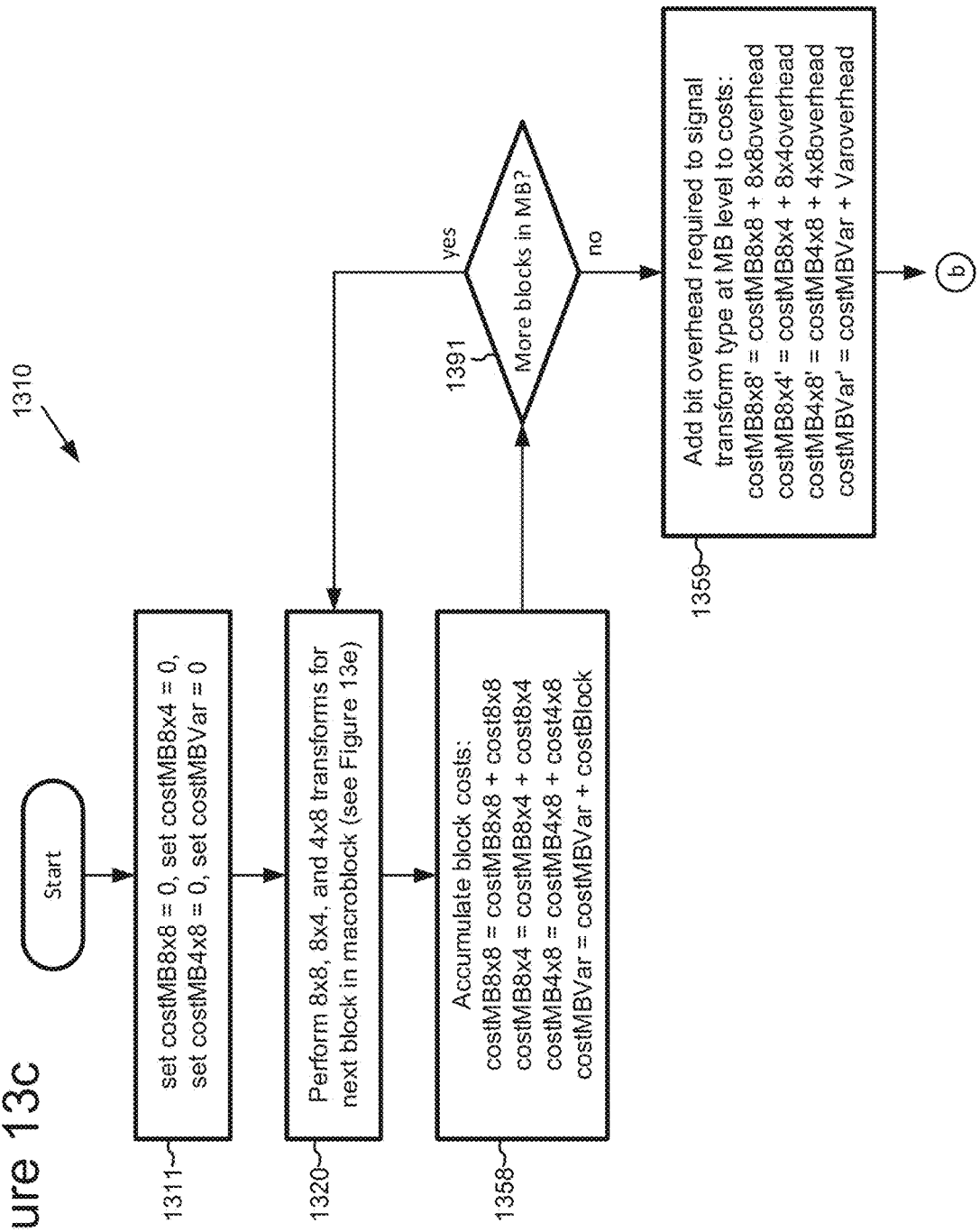

Figure 16a

| 0  | 2  | 3  | 9  | 10 | 23 | 24 | 38 |
|----|----|----|----|----|----|----|----|
| 1  | 4  | 8  | 11 | 22 | 25 | 37 | 39 |
| 5  | 7  | 12 | 21 | 26 | 36 | 40 | 51 |
| 6  | 13 | 20 | 27 | 35 | 41 | 50 | 52 |
| 14 | 19 | 28 | 34 | 42 | 49 | 53 | 60 |
| 15 | 18 | 33 | 43 | 48 | 54 | 59 | 61 |
| 16 | 29 | 32 | 44 | 47 | 55 | 58 | 62 |
| 17 | 30 | 31 | 45 | 46 | 56 | 57 | 63 |

| 0  | 1  | 2  | 4  | 8  | 14 | 21 | 27 |
|----|----|----|----|----|----|----|----|
| 3  | 5  | 6  | 9  | 13 | 17 | 24 | 29 |
| 7  | 10 | 12 | 15 | 18 | 22 | 25 | 30 |
| 11 | 16 | 19 | 20 | 23 | 26 | 28 | 31 |

| 0  | 2  | 7  | 19 |
|----|----|----|----|
| 1  | 4  | 9  | 22 |
| 3  | 6  | 12 | 24 |
| 5  | 10 | 15 | 26 |
| 8  | 14 | 18 | 28 |
| 11 | 17 | 23 | 29 |
| 13 | 20 | 25 | 30 |
| 16 | 21 | 27 | 31 |

1603

SUB-BLOCK TRANSFORM CODING OF PREDICTION RESIDUALS

RELATED APPLICATION INFORMATION

The present application is a continuation of U.S. patent application Ser. No. 15/246,237, filed Aug. 24, 2016, which is a continuation of U.S. patent application Ser. No. 14/337,578, filed Jul. 22, 2014, now U.S. Pat. No. 9,456,216, which is a continuation of U.S. patent application Ser. No. 11/890,059, filed Aug. 3, 2007, now U.S. Pat. No. 8,817,868, which is a divisional of U.S. patent application Ser. No. 10/322,352, filed Dec. 17, 2002, now U.S. Pat. No. 7,266,149, the disclosure of which is incorporated by reference, which claims the benefit of U.S. Provisional Patent Application Ser. No. 60/341,674, entitled "Techniques and Tools for Video Encoding and Decoding," filed Dec. 17, 2001, the disclosure of which is incorporated by reference. The following U.S. patent applications relate to the present application: 1) U.S. patent application Ser. No. 10/322,171, entitled, "Spatial Extrapolation of Pixel Values in Intraframe Video Coding and Decoding," filed Dec. 17, 2002, now U.S. Pat. No. 7,116,830; 2) U.S. patent application Ser. No. 10/322,351, entitled, "Multi-Resolution Motion Estimation and Compensation," filed Dec. 17, 2002; and 3) U.S. patent application Ser. No. 10/322,383, entitled, "Motion Compensation Loop with Filtering," filed Dec. 17, 2002, now U.S. Pat. No. 7,120,197.

TECHNICAL FIELD

Techniques and tools for sub-block transform coding are described. For example, a video encoder adaptively switches between 8×8, 8×4, and 4×8 DCTs when encoding 8×8 prediction residual blocks.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bitrate, of a typical raw digital video sequence can be 5 million bits/second or more.

Most computers and computer networks lack the resources to process raw digital video. For this reason, engineers use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

In general, video compression techniques include intraframe compression and interframe compression. Intraframe compression techniques compress individual frames, typically called I-frames, or key frames. Interframe compression techniques compress frames with reference to preceding and/or following frames, and are called typically called predicted frames, P-frames, or B-frames.

Microsoft Corporation's Windows Media Video, Version 7 ["WMV7"] includes a video encoder and a video decoder. The WMV7 encoder uses intraframe and interframe compression, and the WMV7 decoder uses intraframe and interframe decompression.

A. Intraframe Compression in WMV7

FIG. 1 illustrates block-based intraframe compression (100) of a block (105) of pixels in a key frame in the WMV7 encoder. A block is a set of pixels, for example, an 8×8 arrangement of pixels. The WMV7 encoder splits a key video frame into 8×8 blocks of pixels and applies an 8×8 Discrete Cosine Transform ["DCT"] (110) to individual blocks such as the block (105). A DCT is a type of frequency transform that converts the 8×8 block of pixels (spatial information) into an 8×8 block of DCT coefficients (115), which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). For example, the encoder applies a uniform, scalar quantization step size to each coefficient, which is analogous to dividing each coefficient by the same value and rounding. For example, if a DCT coefficient value is 163 and the step size is 10, the quantized DCT coefficient value is 16. Quantization is lossy. The reconstructed DCT coefficient value will be 160, not 163. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding column or row of the neighboring 8×8 block. FIG. 1 shows the left column (127) of AC coefficients encoded as a differential (147) from the left column (137) of the neighboring (to the left) block (135). The differential coding increases the chance that the differential coefficients have zero values. The remaining AC coefficients are from the block (125) of quantized DCT coefficients.

The encoder scans (150) the 8×8 block (145) of predicted, quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

A key frame contributes much more to bitrate than a predicted frame. In low or mid-bitrate applications, key frames are often critical bottlenecks for performance, so efficient compression of key frames is critical.

FIG. 2 illustrates a disadvantage of intraframe compression such as shown in FIG. 1. In particular, exploitation of redundancy between blocks of the key frame is limited to prediction of a subset of frequency coefficients (e.g., the DC coefficient and the left column (or top row) of AC coefficients) from the left (220) or top (230) neighboring block of a block (210). The DC coefficient represents the average of the block, the left column of AC coefficients represents the averages of the rows of a block, and the top row represents the averages of the columns. In effect, prediction of DC and AC coefficients as in WMV7 limits extrapolation to the row-wise (or column-wise) average signals of the left (or top) neighboring block. For a particular row (221) in the left block (220), the AC coefficients in the left DCT coefficient column for the left block (220) are used to predict the entire corresponding row (211) of the block (210). The disadvantages of this prediction include:

1) Since the prediction is based on averages, the far edge of the neighboring block has the same influence on the predictor as the adjacent edge of the neighboring block, whereas intuitively the far edge should have a smaller influence.
2) Only the average pixel value across the row (or column) is extrapolated.
3) Diagonally oriented edges or lines that propagate from either predicting block (top or left) to the current block are not predicted adequately.
4) When the predicting block is to the left, there is no enforcement of continuity between the last row of the top block and the first row of the extrapolated block.

B. Interframe Compression in WMV7

Interframe compression in the WMV7 encoder uses block-based motion compensated prediction coding followed by transform coding of the residual error. FIGS. 3 and 4 illustrate the block-based interframe compression for a predicted frame in the WMV7 encoder. In particular, FIG. 3 illustrates motion estimation for a predicted frame (310) and FIG. 4 illustrates compression of a prediction residual for a motion-estimated block of a predicted frame.

The WMV7 encoder splits a predicted frame into 8×8 blocks of pixels. Groups of 4 8×8 blocks form macroblocks. For each macroblock, a motion estimation process is performed. The motion estimation approximates the motion of the macroblock of pixels relative to a reference frame, for example, a previously coded, preceding frame. In FIG. 3, the WMV7 encoder computes a motion vector for a macroblock (315) in the predicted frame (310). To compute the motion vector, the encoder searches in a search area (335) of a reference frame (330). Within the search area (335), the encoder compares the macroblock (315) from the predicted frame (310) to various candidate macroblocks in order to find a candidate macroblock that is a good match. The encoder can check candidate macroblocks every pixel or every ½ pixel in the search area (335), depending on the desired motion estimation resolution for the encoder. Other video encoders check at other increments, for example, every ¼ pixel. For a candidate macroblock, the encoder checks the difference between the macroblock (315) of the predicted frame (310) and the candidate macroblock and the cost of encoding the motion vector for that macroblock. After the encoder finds a good matching macroblock, the block matching process ends. The encoder outputs the motion vector (entropy coded) for the matching macroblock so the decoder can find the matching macroblock during decoding. When decoding the predicted frame (310), a decoder uses the motion vector to compute a prediction macroblock for the macroblock (315) using information from the reference frame (330). The prediction for the macroblock (315) is rarely perfect, so the encoder usually encodes 8×8 blocks of pixel differences (also called the error or residual blocks) between the prediction macroblock and the macroblock (315) itself.

Motion estimation and compensation are effective compression techniques, but various previous motion estimation/compensation techniques (as in WMV7 and elsewhere) have several disadvantages, including:

1) The resolution of the motion estimation (i.e., pixel, ½ pixel, ¼ pixel increments) does not adapt to the video source. For example, for different qualities of video source (clean vs. noisy), the video encoder uses the same resolution of motion estimation, which can hurt compression efficiency.
2) For ¼ pixel motion estimation, the search strategy fails to adequately exploit previously completed computations to speed up searching.
3) For ¼ pixel motion estimation, the search range is too large and inefficient. In particular, the horizontal resolution is the same as the vertical resolution in the search range, which does not match the motion characteristics of many video signals.
4) For ¼ pixel motion estimation, the representation of motion vectors is inefficient to the extent bit allocation for horizontal movement is the same as bit allocation for vertical resolution.

FIG. 4 illustrates the computation and encoding of an error block (435) for a motion-estimated block in the WMV7 encoder. The error block (435) is the difference between the predicted block (415) and the original current block (425). The encoder applies a DCT (440) to error block (435), resulting in 8×8 block (445) of coefficients. Even more than was the case with DCT coefficients for pixel values, the significant information for the error block (435) is concentrated in low frequency coefficients (conventionally, the upper left of the block (445)) and many of the high frequency coefficients have values of zero or close to zero (conventionally, the lower right of the block (445)).

The encoder then quantizes (450) the DCT coefficients, resulting in an 8×8 block of quantized DCT coefficients (455). The quantization step size is adjustable. Again, since low frequency DCT coefficients tend to have higher values, quantization results in loss of precision, but not complete loss of the information for the coefficients. On the other hand, since high frequency DCT coefficients tend to have values of zero or close to zero, quantization of the high frequency coefficients results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block (455) of quantized DCT coefficients for entropy encoding. The encoder scans (460) the 8×8 block (455) into a one dimensional array (465) with 64 elements, such that coefficients are generally ordered from lowest frequency to highest frequency, which typical creates long runs of zero values.

The encoder entropy encodes the scanned coefficients using a variation of run length coding (470). The encoder selects an entropy code from one or more run/level/last tables (475) and outputs the entropy code.

FIG. 5 shows the decoding process (500) for an inter-coded block. Due to the quantization of the DCT coefficients, the reconstructed block (575) is not identical to the corresponding original block. The compression is lossy.

In summary of FIG. 5, a decoder decodes (510, 520) entropy-coded information representing a prediction residual using variable length decoding and one or more run/level/last tables (515). The decoder inverse scans (530) a one-dimensional array (525) storing the entropy-decoded information into a two-dimensional block (535). The decoder inverse quantizes and inverse discrete cosine transforms (together, 540) the data, resulting in a reconstructed error block (545). In a separate path, the decoder computes a predicted block (565) using motion vector information (555) for displacement from a reference frame. The decoder combines (570) the predicted block (555) with the reconstructed error block (545) to form the reconstructed block (575).

The amount of change between the original and reconstructed frame is termed the distortion and the number of bits required to code the frame is termed the rate. The amount of distortion is roughly inversely proportional to the rate. In other words, coding a frame with fewer bits (greater compression) will result in greater distortion and vice versa. One of the goals of a video compression scheme is to try to improve the rate-distortion—in other words to try to achieve the same distortion using fewer bits (or the same bits and lower distortion).

Compression of prediction residuals as in WMV7 can dramatically reduce bitrate while slightly or moderately affecting quality, but the compression technique is less than optimal in some circumstances. The size of the frequency transform is the size of the prediction residual block (e.g., an 8×8 DCT for an 8×8 prediction residual). In some circumstances, this fails to exploit localization of error within the prediction residual block.

C. Post-Processing with a Deblocking Filter in WMV7

For block-based video compression and decompression, quantization and other lossy processing stages introduce distortion that commonly shows up as blocky artifacts—perceptible discontinuities between blocks.

To reduce the perceptibility of blocky artifacts, the WMV7 decoder can process reconstructed frames with a deblocking filter. The deblocking filter smoothes the boundaries between blocks.

While the deblocking filter in WMV7 improves perceived video quality, it has several disadvantages. For example, the smoothing occurs only on reconstructed output in the decoder. Therefore, prediction processes such as motion estimation cannot take advantage of the smoothing. Moreover, the smoothing by the post-processing filter can be too extreme.

D. Standards for Video Compression and Decompression

Aside from WMV7, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV7, these standards use a combination of intraframe and interframe compression, although the standards typically differ from WMV7 in the details of the compression techniques used. For additional detail about the standards, see the standards' specifications themselves.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to transform coding and inverse transform coding of blocks of prediction residuals with sub-block transforms. With sub-block transforms, the encoder can react to localization of error within prediction residual blocks. The various techniques and tools can be used in combination or independently.

According to a first set of techniques and tools, a video encoder adaptively sets transform sizes for coding prediction residuals, switching between multiple available block and sub-block transform sizes. For example, for a 8×8 prediction residual block, the encoder switches between an 8×8, two 8×4, or two 4×8 DCTs. A video decoder adaptively switches block transform sizes in decoding.

According to a second set of techniques and tools, a video encoder makes a switching decision for transform sizes in a closed loop (actual testing of the options). Alternatively, the encoder uses an open loop (estimation of suitability of the options), which emphasizes computational simplicity over reliability.

According to a third set of techniques and tools, a video encoder makes a switching decision for transform sizes at the frame, macroblock, block, and/or other levels. For example, the encoder evaluates the efficiency of switching at frame, macroblock, and block levels and embeds flags in the bitstream at the selected switching levels. This allows the encoder to find a solution that weighs distortion reduction/bitrate gain against signaling overhead for different levels (e.g., frame, macroblock, block) of control. A video decoder reacts to the switching at different levels during decoding.

According to a fourth set of techniques and tools, for different transform sizes, a video encoder uses different scan patterns to order the elements of a two-dimensional block of coefficient data in a one-dimensional array. By using different scan patterns, the encoder decreases the entropy of the values in the one-dimensional array, for example, by improving localization of groups of zero values. A video decoder uses the different scan patterns during decoding for different transform sizes.

According to a fifth set of techniques and tools, a video encoder uses a sub-block pattern code to indicate the presence or absence of information for the sub-blocks of a prediction residual. For example, a sub-block pattern code indicates which of two 4×8 sub-blocks has associated compressed information in a bitstream and which has no such information. A video decoder receives and reacts to sub-block pattern codes during decoding.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to prior art.

FIG. 2 is a diagram showing prediction of frequency coefficients according to the prior art.

FIG. 3 is a diagram showing motion estimation in a video encoder according to the prior art.

FIG. 4 is a diagram showing block-based interframe compression for an 8×8 block of prediction residuals in a video encoder according to the prior art.

FIG. 5 is a diagram showing block-based interframe decompression for an 8×8 block of prediction residuals according to the prior art.

FIG. 6 is a block diagram of a suitable computing environment in which several described embodiments may be implemented.

FIGS. 11a-11d are code listings showing example pseudo-code for 4-point and 8-point IDCT operations for rows and columns.

FIGS. 13a-13f are flowcharts of a closed loop technique for setting transform sizes for prediction residuals of a frame in a video encoder.

FIGS. 16a-16c are charts showing scan patterns in one implementation.

DETAILED DESCRIPTION

Figure 7:
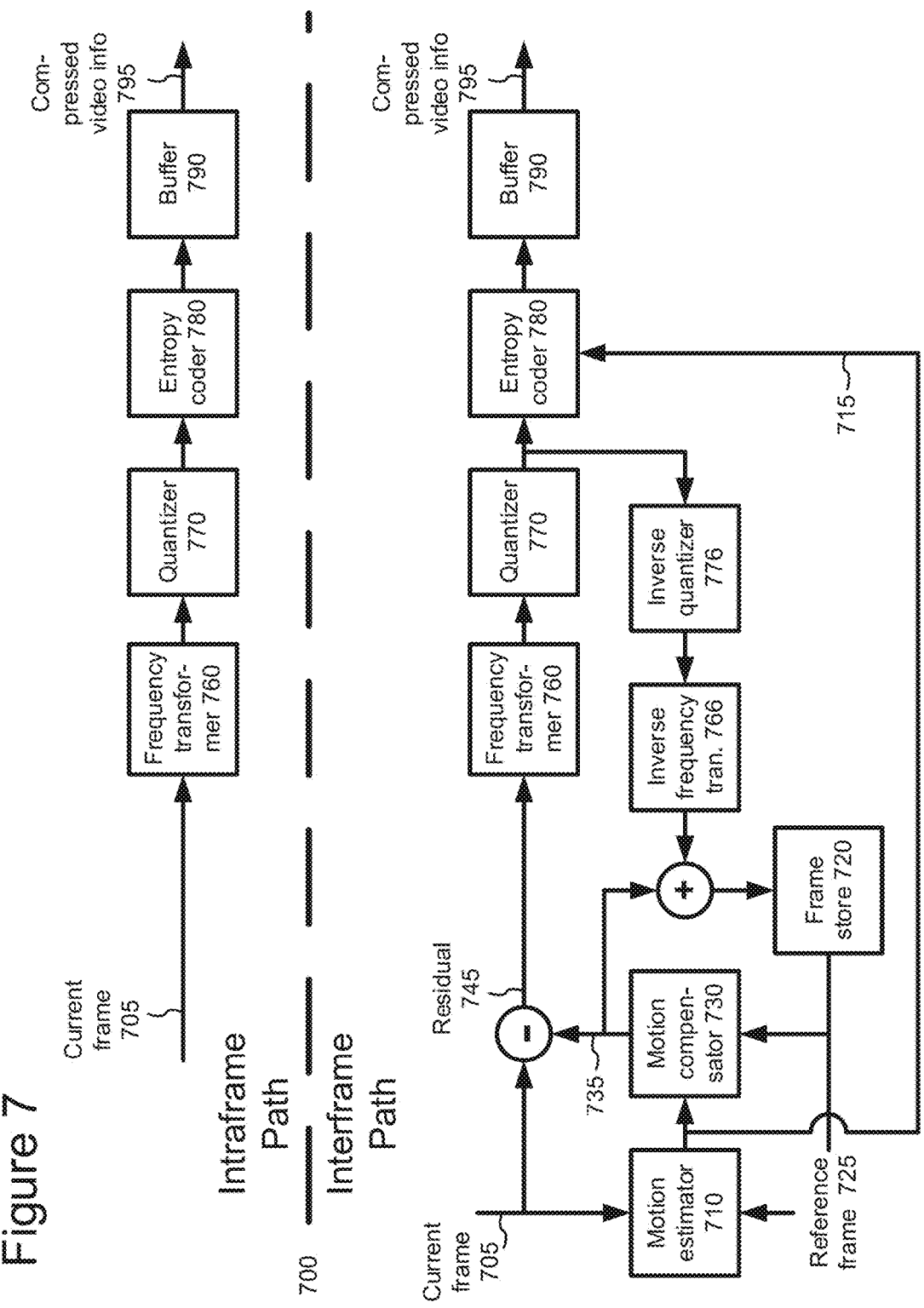
FIG. 7 is a block diagram of a generalized video encoder system used in several described embodiments.

The present application relates to techniques and tools for video encoding and decoding. In various described embodiments, a video encoder incorporates techniques that improve the efficiency of interframe coding, a video decoder incorporates techniques that improve the efficiency of interframe decoding, and a bitstream format includes flags and other codes to incorporate the techniques.

The various techniques and tools can be used in combination or independently. Different embodiments implement one or more of the described techniques and tools.

I. Computing Environment

FIG. 6 illustrates a generalized example of a suitable computing environment (600) in which several of the described embodiments may be implemented. The computing environment (600) is not intended to suggest any limitation as to scope of use or functionality, as the techniques and tools may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing a video encoder or decoder.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600).

The storage (640) may be removable or non-removable, and includes magnetic disks, magnetic tapes or cassettes, CD-ROMs, DVDs, or any other medium which can be used to store information and which can be accessed within the computing environment (600). The storage (640) stores instructions for the software (680) implementing the video encoder or decoder.

The input device(s) (650) may be a touch input device such as a keyboard, mouse, pen, or trackball, a voice input device, a scanning device, or another device that provides input to the computing environment (600). For audio or video encoding, the input device(s) (650) may be a sound card, video card, TV tuner card, or similar device that accepts audio or video input in analog or digital form, or a CD-ROM or CD-RW that reads audio or video samples into the computing environment (600). The output device(s) (660) may be a display, printer, speaker, CD-writer, or another device that provides output from the computing environment (600).

The communication connection(s) (670) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (600), computer-readable media include memory (620), storage (640), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "select," "adjust," and "apply" to describe computer operations in a computing environment.

These terms are high-level abstractions for operations performed by a computer, and should not be confused with acts performed by a human being. The actual computer operations corresponding to these terms vary depending on implementation.

II. Generalized Video Encoder and Decoder

Figure 8:
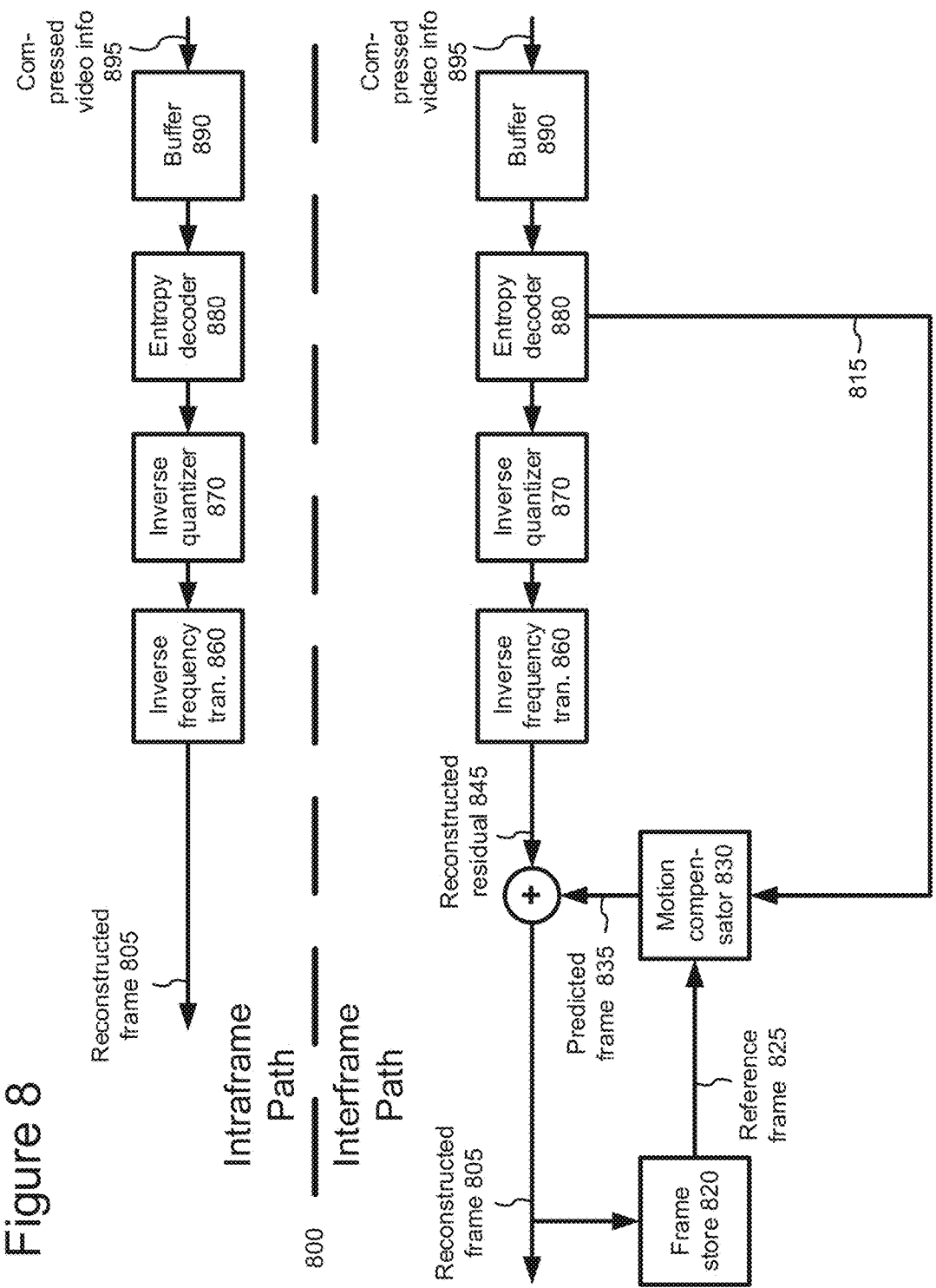
FIG. 8 is a block diagram of a generalized video decoder system used in several described embodiments.

FIG. 7 is a block diagram of a generalized video encoder (700) and FIG. 8 is a block diagram of a generalized video decoder (800).

The relationships shown between modules within the encoder and decoder indicate the main flow of information in the encoder and decoder; other relationships are not shown for the sake of simplicity. In particular, FIGS. 7 and 8 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 8 format or another format.

The encoder (700) and decoder (800) are block-based and use a 4:2:0 macroblock format with each macroblock including 4 luminance 8×8 luminance blocks (at times treated as one 16×16 macroblock) and two 8×8 chrominance blocks. Alternatively, the encoder (700) and decoder (800) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 7 is a block diagram of a general video encoder system (700). The encoder system (700) receives a sequence of video frames including a current frame (705), and produces compressed video information (795) as output. Particular embodiments of video encoders typically use a variation or supplemented version of the generalized encoder (700).

The encoder system (700) compresses predicted frames and key frames. For the sake of presentation, FIG. 7 shows a path for key frames through the encoder system (700) and a path for forward-predicted frames. Many of the components of the encoder system (700) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (705) is a forward-predicted frame, a motion estimator (710) estimates motion of macroblocks or other sets of pixels of the current frame (705) with respect to a reference frame, which is the reconstructed previous frame (725) buffered in the frame store (720). In alternative embodiments, the reference frame is a later frame or the current frame is bi-directionally predicted. The motion estimator (710) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (710) outputs as side information motion information (715) such as motion vectors. A motion compensator (730) applies the motion information (715) to the reconstructed previous frame (725) to form a motion-compensated current frame (735). The prediction is rarely perfect, however, and the difference between the motion-compensated current frame (735) and the original current frame (705) is the prediction residual (745). Alternatively, a motion estimator and motion compensator apply another type of motion estimation/compensation.

A frequency transformer (760) converts the spatial domain video information into frequency domain (i.e., spectral) data. For block-based video frames, the frequency transformer (760) applies a discrete cosine transform ["DCT"] or variant of DCT to blocks of the pixel data or prediction residual data, producing blocks of DCT coefficients. Alternatively, the frequency transformer (760) applies another conventional frequency transform such as a Fourier transform or uses wavelet or subband analysis. In embodiments in which the encoder uses spatial extrapolation (not shown in FIG. 7) to encode blocks of key frames, the frequency transformer (760) can apply a re-oriented frequency transform such as a skewed DCT to blocks of prediction residuals for the key frame. In other embodiments, the frequency transformer (760) applies an 8×8, 8×4, 4×8, or other size frequency transforms (e.g., DCT) to prediction residuals for predicted frames.

A quantizer (770) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (700) can use frame dropping, adaptive filtering, or other techniques for rate control.

When a reconstructed current frame is needed for subsequent motion estimation/compensation, an inverse quantizer (776) performs inverse quantization on the quantized spectral data coefficients. An inverse frequency transformer (766) then performs the inverse of the operations of the frequency transformer (760), producing a reconstructed prediction residual (for a predicted frame) or a reconstructed key frame. If the current frame (705) was a key frame, the reconstructed key frame is taken as the reconstructed current frame (not shown). If the current frame (705) was a predicted frame, the reconstructed prediction residual is added to the motion-compensated current frame (735) to form the reconstructed current frame. The frame store (720) buffers the reconstructed current frame for use in predicting the next frame. In some embodiments, the encoder applies a deblocking filter to the reconstructed frame to adaptively smooth discontinuities in the blocks of the frame.

The entropy coder (780) compresses the output of the quantizer (770) as well as certain side information (e.g., motion information (715), spatial extrapolation modes, quantization step size). Typical entropy coding techniques include arithmetic coding, differential coding, Huffman coding, run length coding, LZ coding, dictionary coding, and combinations of the above. The entropy coder (780) typically uses different coding techniques for different kinds of information (e.g., DC coefficients, AC coefficients, different kinds of side information), and can choose from among multiple code tables within a particular coding technique.

The entropy coder (780) puts compressed video information (795) in the buffer (790). A buffer level indicator is fed back to bitrate adaptive modules.

The compressed video information (795) is depleted from the buffer (790) at a constant or relatively constant bitrate and stored for subsequent streaming at that bitrate. Therefore, the level of the buffer (790) is primarily a function of the entropy of the filtered, quantized video information, which affects the efficiency of the entropy coding. Alternatively, the encoder system (700) streams compressed video information immediately following compression, and the level of the buffer (790) also depends on the rate at which information is depleted from the buffer (790) for transmission.

Before or after the buffer (790), the compressed video information (795) can be channel coded for transmission over the network. The channel coding can apply error detection and correction data to the compressed video information (795).

B. Video Decoder

FIG. 8 is a block diagram of a general video decoder system (800). The decoder system (800) receives information (895) for a compressed sequence of video frames and produces output including a reconstructed frame (805). Particular embodiments of video decoders typically use a variation or supplemented version of the generalized decoder (800).

The decoder system (800) decompresses predicted frames and key frames. For the sake of presentation, FIG. 8 shows a path for key frames through the decoder system (800) and a path for forward-predicted frames. Many of the components of the decoder system (800) are used for compressing both key frames and predicted frames. The exact operations performed by those components can vary depending on the type of information being compressed.

A buffer (890) receives the information (895) for the compressed video sequence and makes the received information available to the entropy decoder (880). The buffer (890) typically receives the information at a rate that is fairly constant over time, and includes a jitter buffer to smooth short-term variations in bandwidth or transmission. The buffer (890) can include a playback buffer and other buffers as well. Alternatively, the buffer (890) receives information at a varying rate. Before or after the buffer (890), the compressed video information can be channel decoded and processed for error detection and correction.

The entropy decoder (880) entropy decodes entropy-coded quantized data as well as entropy-coded side information (e.g., motion information (815), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (880) frequently uses different decoding techniques for different kinds of information (e.g., DC coefficients, AC coefficients, different kinds of side information), and can choose from among multiple code tables within a particular decoding technique.

If the frame (805) to be reconstructed is a forward-predicted frame, a motion compensator (830) applies motion information (815) to a reference frame (825) to form a prediction (835) of the frame (805) being reconstructed. For example, the motion compensator (830) uses a macroblock motion vector to find a macroblock in the reference frame (825). A frame buffer (820) stores previous reconstructed frames for use as reference frames. The motion compensator (830) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (800) also reconstructs prediction residuals.

When the decoder needs a reconstructed frame for subsequent motion compensation, the frame store (820) buffers the reconstructed frame for use in predicting the next frame. In some embodiments, the encoder applies a deblocking filter to the reconstructed frame to adaptively smooth discontinuities in the blocks of the frame.

An inverse quantizer (870) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (860) converts the quantized, frequency domain data into spatial domain video information. For block-based video frames, the inverse frequency transformer (860) applies an inverse DCT ["IDCT"] or variant of IDCT to blocks of the DCT coefficients, producing pixel data or prediction residual data for key frames or predicted frames, respectively. Alternatively, the frequency transformer (860) applies another conventional inverse frequency transform such as a Fourier transform or uses wavelet or subband synthesis. In embodiments in which the decoder uses spatial extrapolation (not shown in FIG. 8) to decode blocks of key frames, the inverse frequency transformer (860) can apply a re-oriented inverse frequency transform such as a skewed IDCT to blocks of prediction residuals for the key frame. In other embodiments, the inverse frequency transformer (860) applies an 8×8, 8×4, 4×8, or other size inverse frequency transforms (e.g., IDCT) to prediction residuals for predicted frames.

III. Intraframe Encoding and Decoding

In one or more embodiments, a video encoder exploits redundancies in typical still images in order to code the I-frame information using a smaller number of bits. For additional detail about intraframe encoding and decoding in some embodiments, see U.S. patent application Ser. No. aa/bbb,ccc, entitled "Spatial Extrapolation of Pixel Values in Intraframe Video Coding and Decoding," filed concurrently herewith.

IV. Interframe Encoding and Decoding

Inter-frame coding exploits temporal redundancy between frames to achieve compression. Temporal redundancy reduction uses previously coded frames as predictors when coding the current frame.

A. Motion Estimation

In one or more embodiments, a video encoder exploits temporal redundancies in typical video sequences in order to code the information using a smaller number of bits. The video encoder uses motion estimation/compensation of a macroblock or other set of pixels of a current frame with respect to a reference frame. A video decoder uses corresponding motion compensation. For additional detail about motion estimation and motion compensation in some embodiments, see U.S. patent application Ser. No. aa/bbb, ccc, entitled "Multi-Resolution Motion Estimation and Compensation," filed concurrently herewith.

B. Coding of Prediction Residuals

Motion estimation is rarely perfect, and the video encoder uses prediction residuals to represent the differences between the original video information and the video information predicted using motion estimation.

In one or more embodiments, a video encoder exploits redundancies in prediction residuals in order to code the information using a smaller number of bits. The video encoder compresses prediction residuals for blocks or other sets of pixel domain information of a frame using sub-block transforms. A video decoder uses corresponding decompression using sub-block inverse transforms. By using sub-block transforms, the encoder reacts to localization of error patterns in the data, which improves the efficiency of compression. Various features of the compression and decompression using sub-block transforms can be used in combination or independently. These features include, but are not limited to:

1) Adaptively setting transform sizes for spatial domain data by switching between multiple available transform sizes. For example, when coding a prediction residual, a video encoder adaptively switches between multiple available transform sizes for a transform such as DCT. For an 8×8 prediction residual block, the encoder can switch between an 8×8 DCT, two 4×8 DCTs, or two 8×4 DCTs. A video decoder adaptively switches transform sizes during decoding.

2a) Setting transform sizes for spatial domain data by making a switching decision in a closed loop. The video encoder actually tests the different transform sizes and then selects one.

2b) Setting transform sizes for spatial domain data by making a switching decision in a open loop. The video encoder estimates the suitability of the different transform sizes and then selects one.

3a) Switching transform sizes for spatial domain data for a frame at the frame level in a video encoder or decoder.

3b) Switching transform sizes for spatial domain data for a frame at the macroblock level in a video encoder or decoder.

3c) Switching transform sizes for spatial domain data for a frame at the block level in a video encoder or decoder.

3d) Switching transform sizes for spatial domain data for a frame at the macroblock level or block level within the frame in a video encoder or decoder.

4) Switching scan patterns for spatial domain data for a frame for different transform sizes in a video encoder or decoder. Switching scan patterns decreases the entropy of the one-dimensional data, which improves the efficiency of subsequent entropy coding.

5) Using a sub-block patter code to indicate the presence or absence of information for sub-blocks of a block of spatial domain data. For example, for an 8×8 prediction residual block, the sub-block patter code indicates the presence or absence of information for the sub-blocks associated with the sub-block transform for the block. Using the sub-block pattern codes reduces bitrate for zero-value sub-block information. A video encoder outputs sub-block pattern codes; a video decoder receives them.

To code prediction residuals, a video encoder uses a frequency transform with a transform size selected from multiple available transform sizes (alternatively called transform types). In some embodiments, a video encoder applies a frequency transform to a prediction residual block following motion compensation. The frequency transform is a DCT or other frequency transform. For an 8×8 block, the encoder selects between an 8×8 transform, two 4×8 transforms, or two 8×4 transforms. If two 8×4 DCTs are used, the 8×8 residual block is divided horizontally into two 8×4 sub-blocks, which are transformed into two 8×4 DCT arrays. Likewise, if two 4×8 DCTs are used, the 8×8 residual block is divided vertically into two 4×8 sub-blocks, which are transformed into two 4×8 DCT arrays. A video decoder uses an inverse frequency transform with a transform size selected from multiple available transform sizes. In alternative embodiments, the encoder and decoder work with sets of values other than 8×8 blocks, work with information other than prediction residuals following motion compensation (e.g., for intraframe coding), and/or use a different transform.

To determine which transform size to use, a video encoder evaluates the different transform sizes. In some embodiments, the encoder evaluates the different transform sizes in a closed loop. The encoder tests a frequency transform at each of the transform sizes, and evaluates the results with a rate, distortion, or rate-distortion criterion. The encoder can test the transform at varying switching levels (e.g., frame, macroblock, block) as well. In alternative embodiments, the encoder evaluates the different transform sizes in an open loop, estimating the suitability of the different transform sizes without actually applying the different transform sizes.

A video encoder and decoder switch between transform sizes. In some embodiments, a video encoder sets switching flags at varying levels (e.g., frame, macroblock, and/or block) from frame to frame. A decoder makes corresponding switches during decoding. In alternative embodiments, the encoder always switches on a per-frame basis, a per-macroblock basis, a per-block basis, a mixed macroblock or block basis, or some other basis.

Following the frequency transform, a video encoder converts a two-dimensional array of frequency coefficients into a one-dimensional array for entropy encoding. Conversely, a decoder converts a one-dimensional array of frequency coefficients into a two-dimensional array following entropy decoding. In some embodiments, an encoder/decoder selects a scan pattern from among multiple available scan patterns based upon a transform size.

Following the frequency transform, a video encoder entropy encodes the frequency-transformed data. In some embodiments, a video encoder determines whether data for a particular sub-block is absent or insignificant. In a sub-block pattern code, the encoder indicates the presence or absence of information for sub-blocks of a frequency-transformed block of data. A video decoder receives the sub-block pattern code and determines whether information is present or absent for particular sub-blocks of a block. In alternative embodiments, the encoder and decoder do not use sub-block pattern codes.

1. Sub-Block Transforms

A video encoder and decoder use sub-block transforms to efficiently code prediction residuals following block-based motion compensation. The encoder/decoder switches between different transform sizes to apply to the prediction residual blocks.

Figure 9:
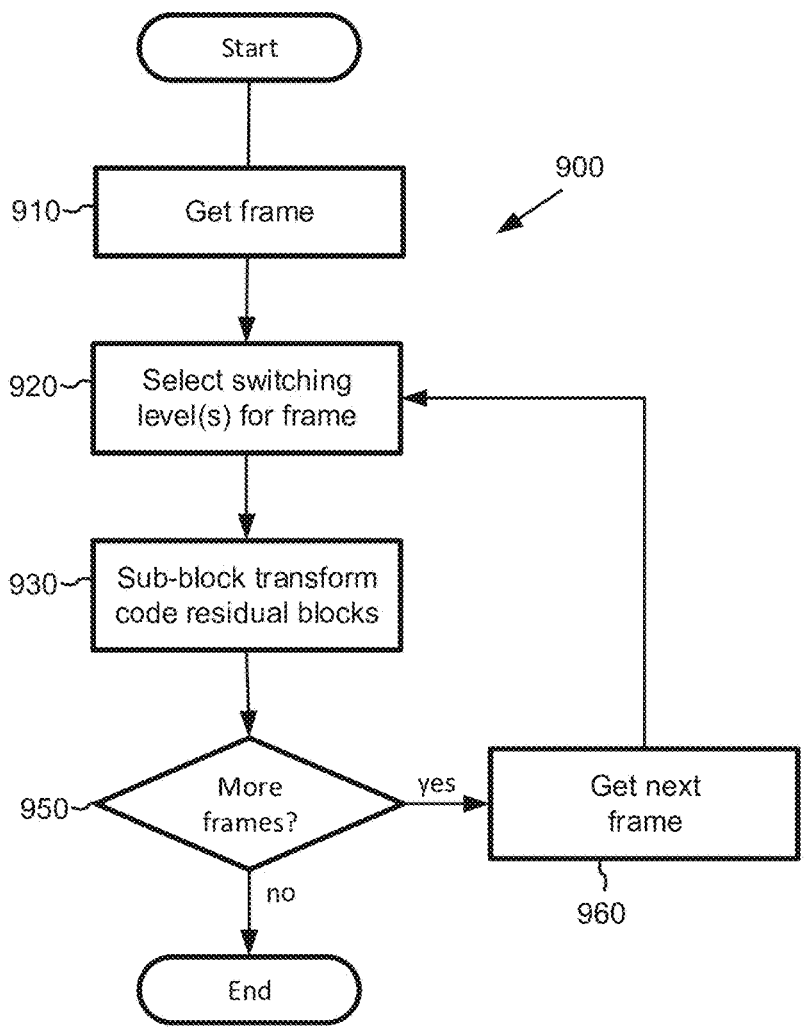
FIG. 9 is a flowchart of a technique for encoding residual blocks with sub-block transforms selected at switching levels in a video encoder.

FIG. 9 shows a technique for switching transform sizes during encoding of prediction residual blocks in a video encoder. A video encoder gets (910) a frame, for example, a predicted video frame. For the sake of simplicity, FIG. 9 does not show the various ways in which the technique (900) can be used in conjunction with other techniques.

The encoder selects (920) switching levels for the frame. For example, the encoder evaluates the performance of the sub-block transform sizes at different switching levels within a closed loop by testing the rate-distortion performance with different levels of switching (e.g., at the frame level only, at macroblock level only, at macroblock and block levels). The closed loop is described in detail below. Or, the encoder evaluates the performance of different switching levels within an open loop. For example, the encoder computes the variance, energy, or some other measure for the prediction residual blocks as partitioned with the different sub-block sizes. The encoder can compute the measure in the spatial domain or frequency domain, on quantized or original data.

The encoder transform codes (930) the prediction residual blocks for the frame using the sub-block transform sizes and switching levels selected above. In one implementation, the encoder uses either an 8×8 DCT, two 4×8 DCTs, or two 8×4 DCTs on an 8×8 prediction residual block, as described in more detail below. Alternatively, the encoder uses another frequency transform and/or has more or fewer transform sizes (e.g., 4×4 sub-block transform).

The encoder determines (950) whether there are any more frames. If not, the technique ends. If so, the encoder gets (960) the next frame and selects (920) switching levels for it.

In one implementation, a video encoder/decoder switches between different sizes of DCT/IDCT when processing 8×8 blocks of prediction residuals. The encoder/decoder use of one of an 8×8 DCT/IDCT, two 4×8 DCT/IDCTs, or two 8×4 DCT/IDCTs for a prediction residual block. For example, if a prediction residual includes many non-zero values in the top half and mostly zero values in the bottom half, the encoder and decoder use the 8×4 transform size to isolate the energy of the block in one sub-block. The 4×8 transform size is similarly indicated when the distribution of values is different on left and right sides of the block. When values are evenly distributed throughout a block, the encoder and decoder use the 8×8 transform. The encoder and decoder can use other transform sizes as well (e.g., 4×4, 2×8, 8×2, 4×2, 2×4, etc.). In general, the potential reduction in rate-distortion for additional transform sizes is weighed against the increase in processing overhead for additional transform sizes, and against potential increases in relative cost of bitrate for signaling overhead for smaller transform sizes.

Figure 10A:
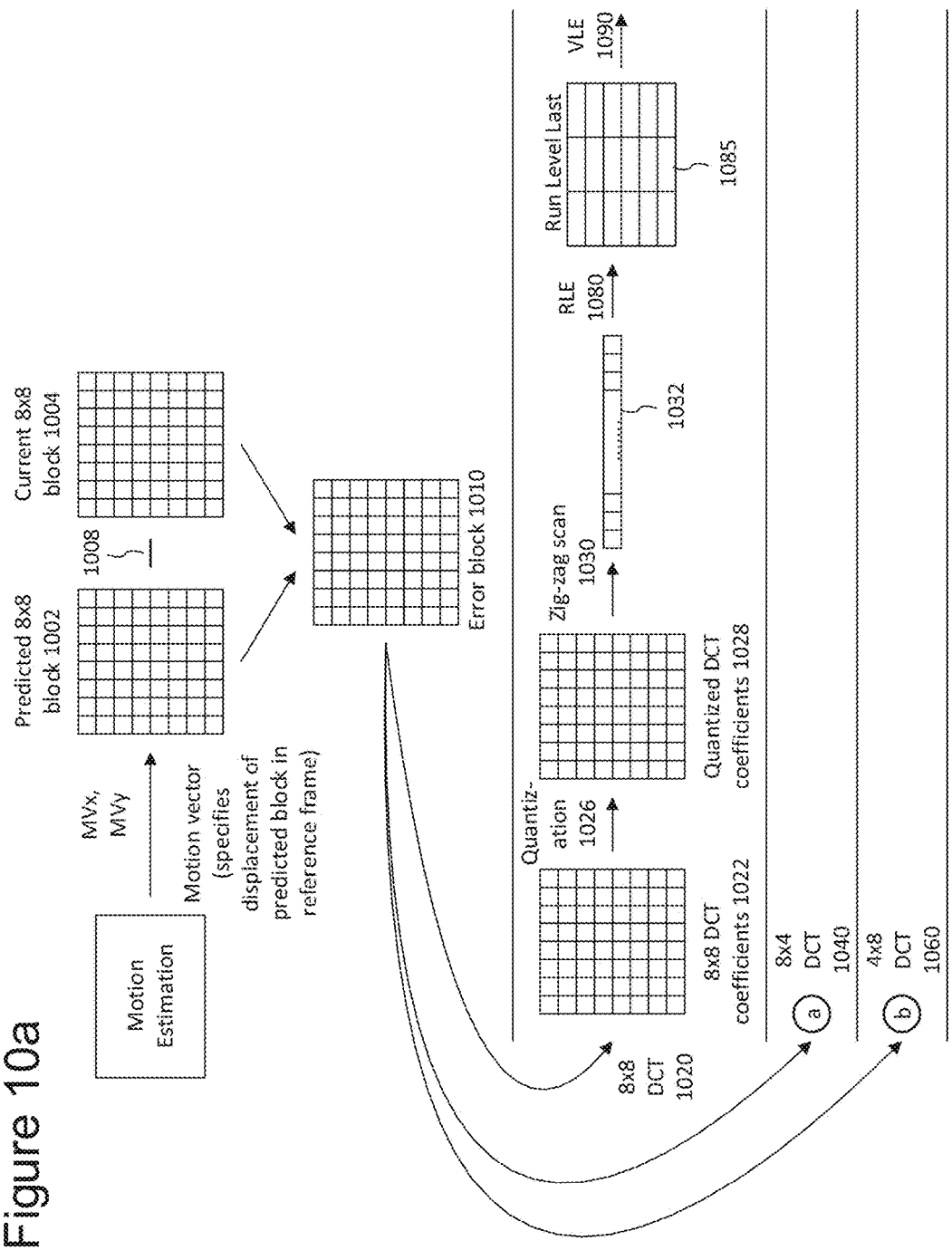
FIGS. 10a-10c are diagrams showing transform coding of a block of prediction residuals using one of several available transform sizes.
Figure 10B:
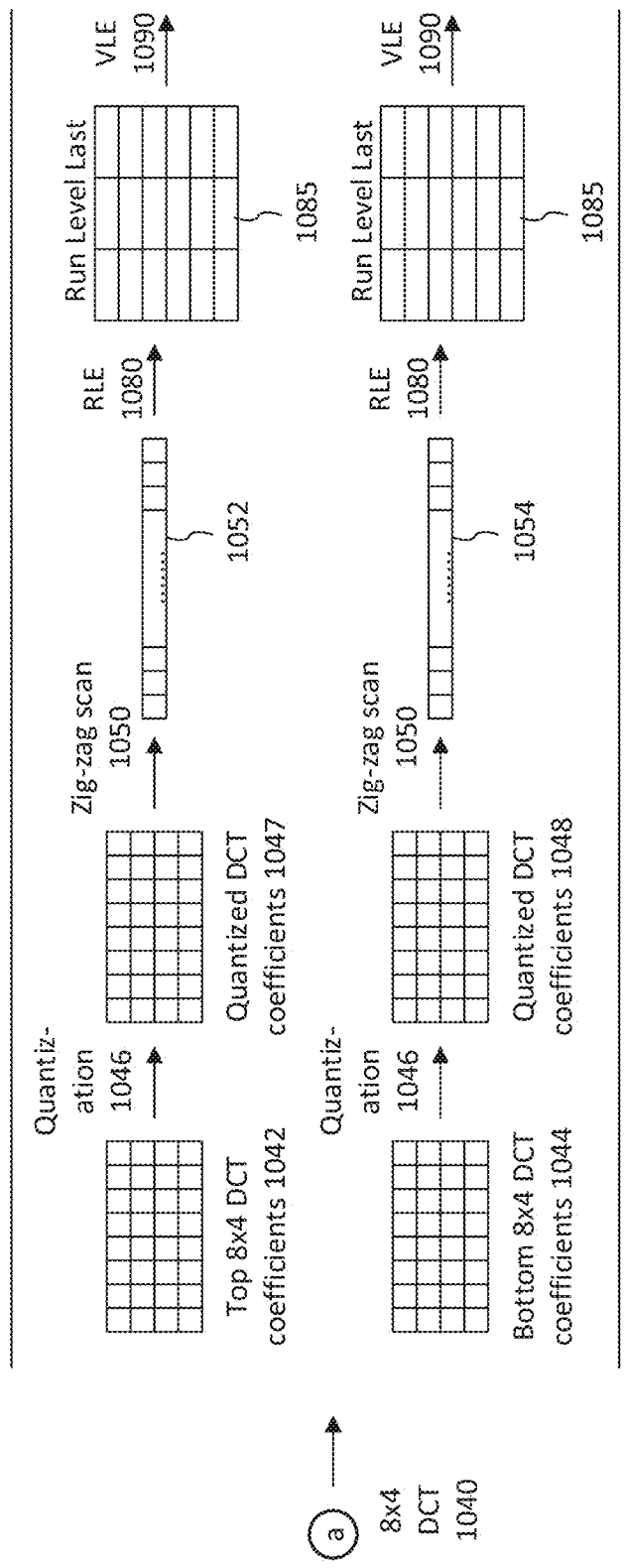
Figure 10C:
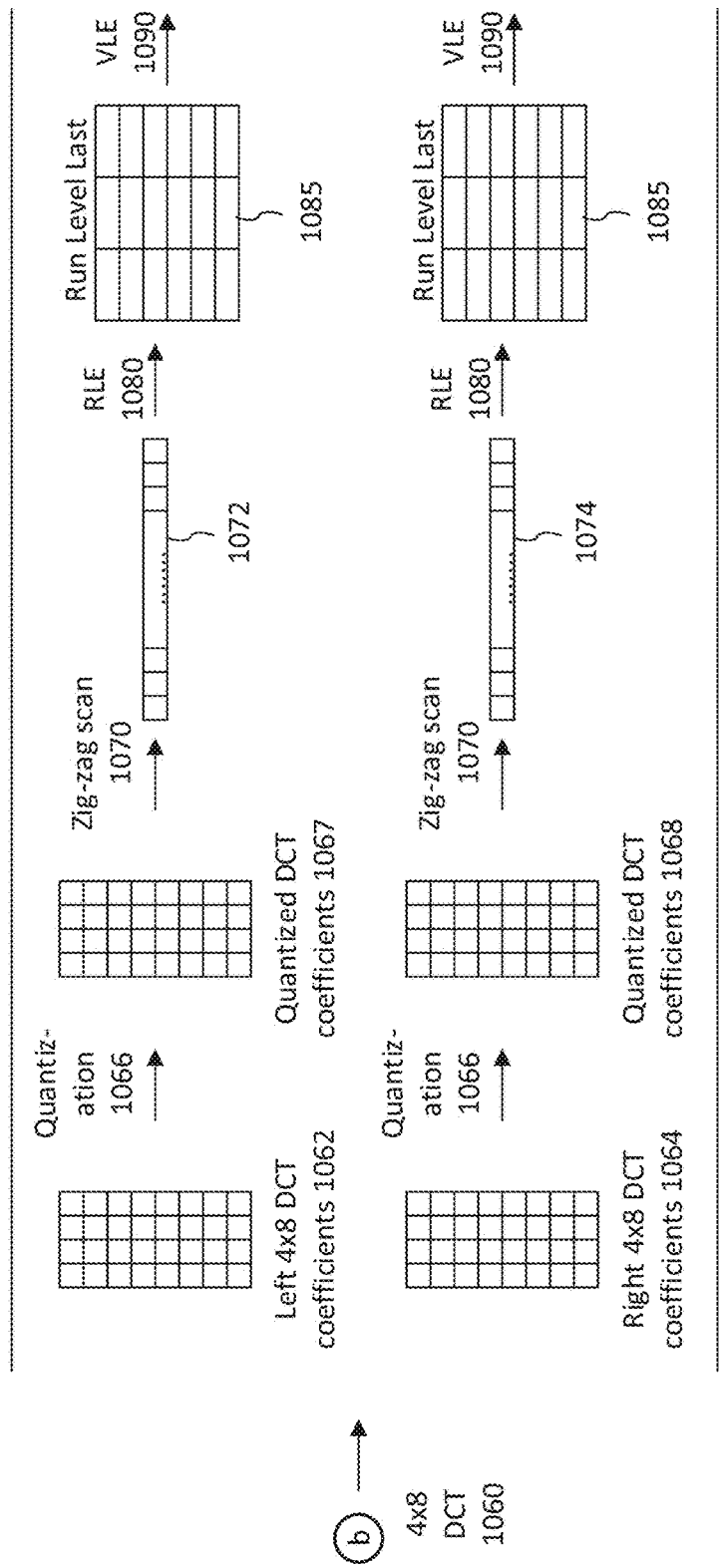
Figure 11B:
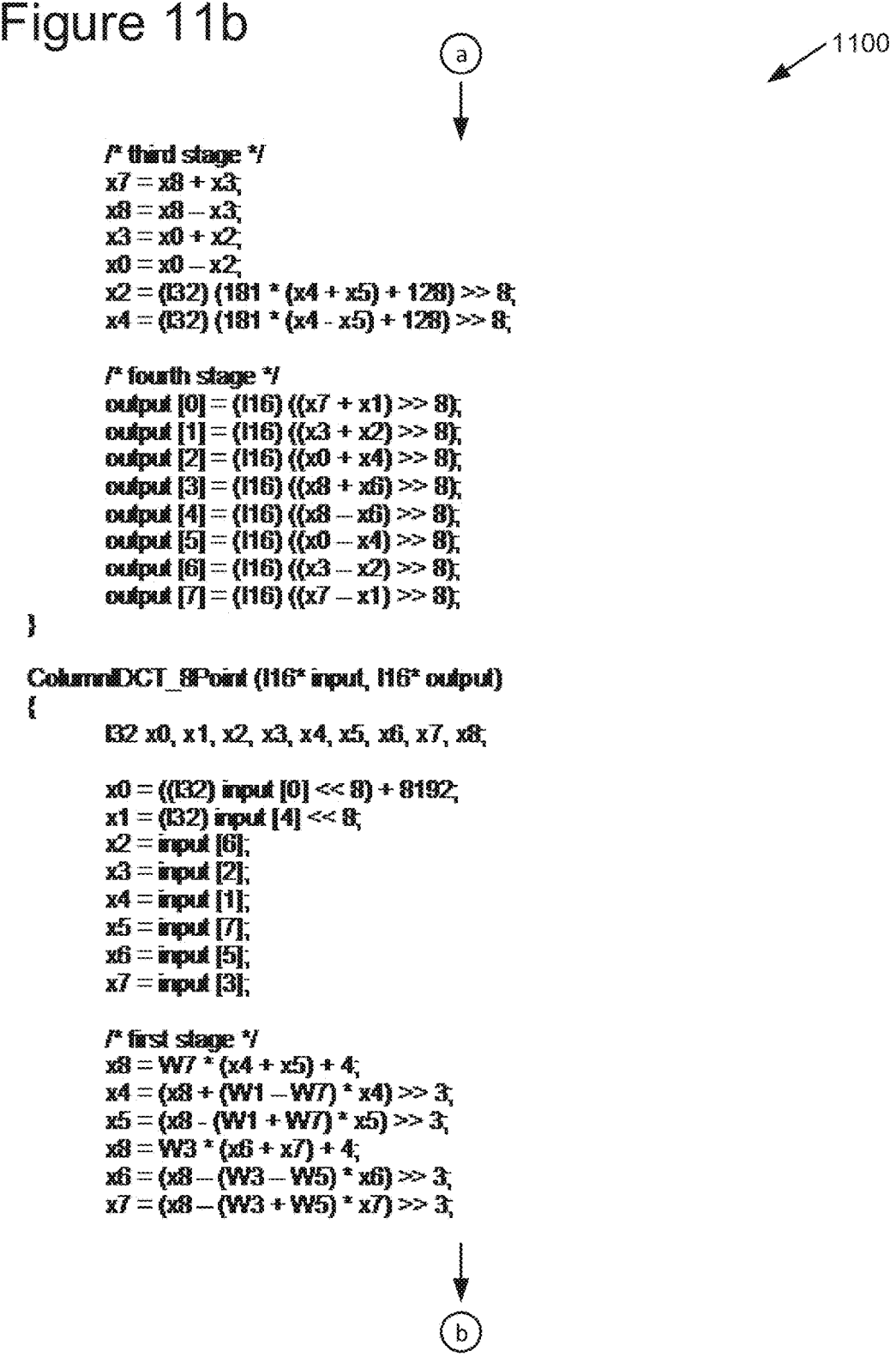
Figure 11C:
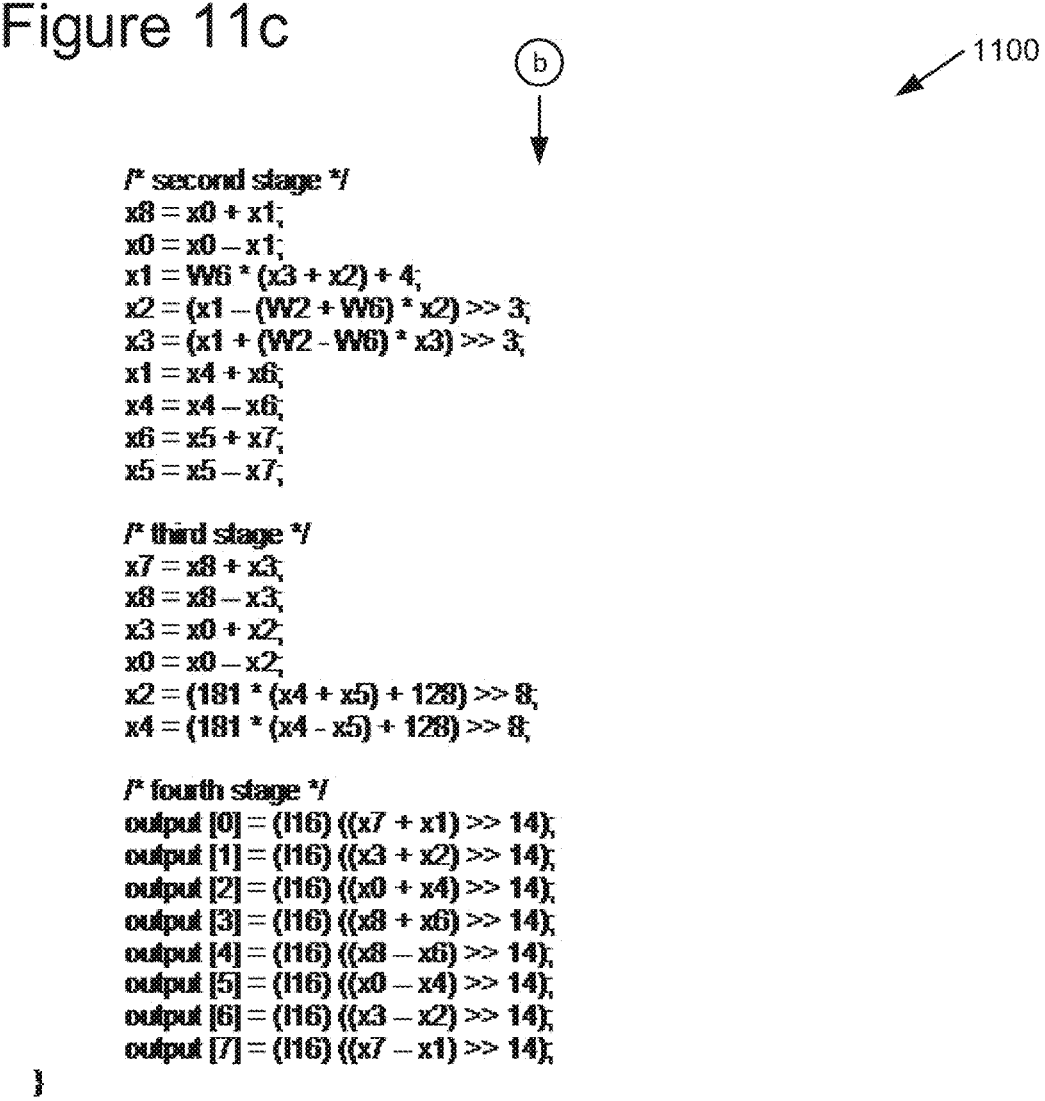
Figure 11D:
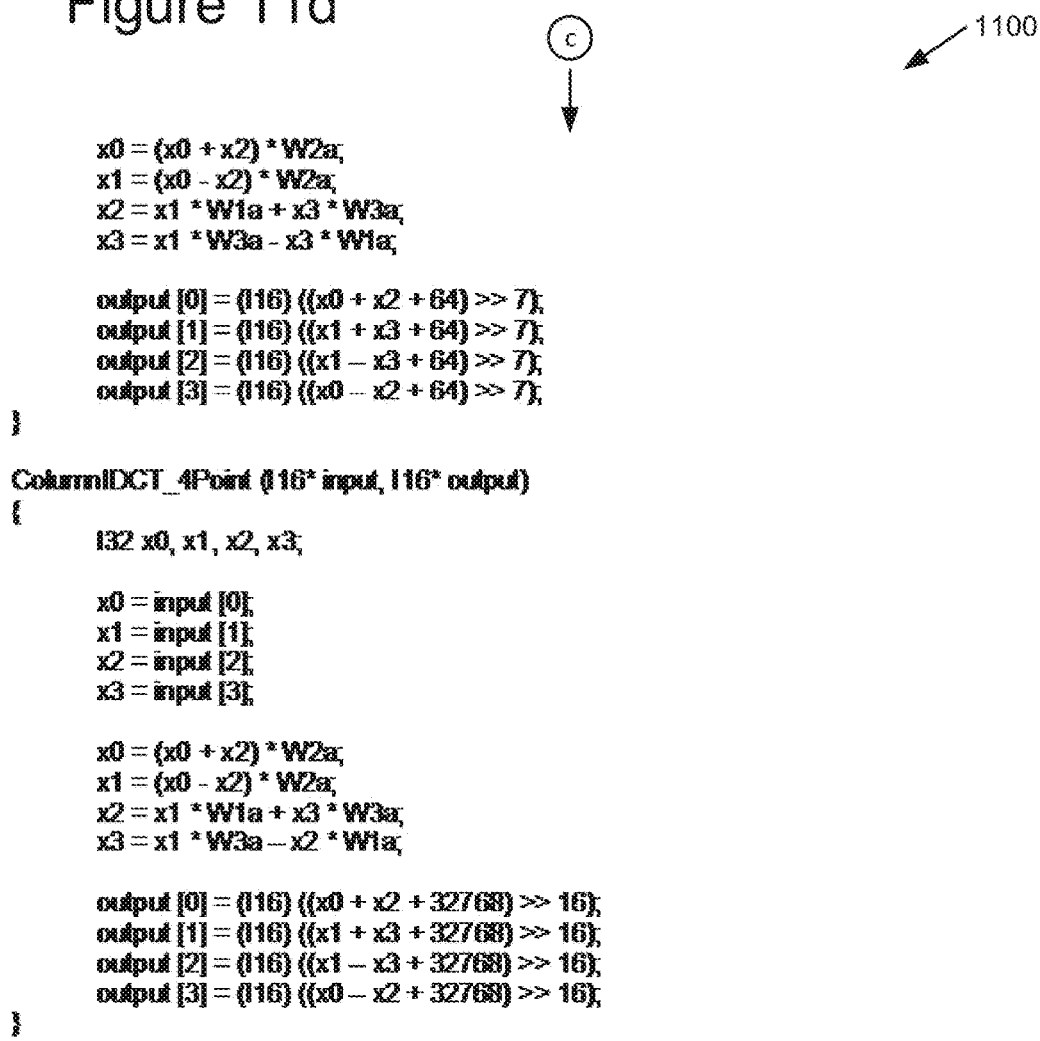

FIGS. 10a-10c show transform coding and compression of an 8×8 prediction error block (1010) using an 8×8 DCT (1020), two 8×4 DCTs (1040), or two 4×8 DCTs (1060) in this implementation. A video encoder computes (1008) an error block (1010) as the difference between a predicted block (1002) and the current 8×8 block (1004). The video encoder applies either an 8×8 DCT (1020), two 8×4 DCTs (1040), or two 4×8 DCTs (1060) to the error block.

FIGS. 11a-11d show example pseudocode (1100) for 4-point and 8-point IDCT operations for rows and columns. For an 8×8 block, an 8-point one-dimensional IDCT operation RowIDCT_Point( ) is performed on each of the 8 rows of the block, then an 8-point one-dimensional IDCT operation ColumnIDCT_8Point( ) is performed on each of the 8 resultant columns. For an 8×4 block, an 8-point one-dimensional IDCT operation RowIDCT_Point( ) is performed on each of the 4 rows of the block, then a 4-point one-dimensional IDCT operation ColumnIDCT_4Point( ) is performed on each of the 8 resultant columns. For a 4×8 block, a 4-point one-dimensional IDCT operation RowIDCT_4Point( ) is performed on each of the 8 rows of the block, then an 8-point one-dimensional IDCT operation ColumnIDCT_8Point( ) is performed on each of the 4 resultant columns.

For the 8×8 DCT (1020), the error block (1010) becomes an 8×8 block of DCT coefficients (1022). The encoder quantizes (1026) the data. The encoder then scans (1030) the block of quantized DCT coefficients (1028) into a one-dimensional array (1032) with 64 elements, such that coefficients are generally ordered from lowest frequency to highest frequency. In the scanning, the encoder uses a scan pattern for the 8×8 DCT. The encoder then entropy codes the one-dimensional array (1032) using a combination of run length coding (1080) and variable length encoding (1090) with one or more run/level/last tables (1085).

In the implementation of FIGS. 10a-10c, with each of the DCT modes, the encoder uses the same run length coding, variable length encoding, and set of one or more run/level/last tables. In other implementations, the encoder uses different sets of run/level/last tables or different entropy encoding techniques for the different DCT modes (e.g., one set of tables for the 8×8 mode, another set for the 8×4 mode, a third set for the 4×8 mode). For example, the encoder selects and signals different entropy code tables for different transform sizes.

For the 8×4 DCT (1040), the error block (1010) becomes two 8×4 blocks of DCT coefficients (1042, 1044), one for the top half of the error block (1010) and one for the bottom half. This can localize significant values in one or the other half. The encoder quantizes (1046) the data. The encoder then scans (1050) the blocks of quantized DCT coefficients (1047, 1048) into one-dimensional arrays (1052, 1054) with 32 elements each, such that coefficients are generally ordered from lowest frequency to highest frequency in each array. In the scanning, the encoder uses a scan pattern for the 8×4 DCT. The encoder then entropy codes the one-dimensional arrays (1052, 1054) using a combination of run length coding (1080) and variable length encoding (1090) with one or more run/level/last tables (1085).

For the 4×8 DCT (1060), the error block (1010) becomes two 4×8 blocks of DCT coefficients (1062, 1064), one for the left half of the error block (1010) and one for the right half. This can localize significant values in one or the other half. The encoder quantizes (1066) the data. The encoder then scans (1070) the blocks of quantized DCT coefficients (1067, 1068) into one-dimensional arrays (1072, 1074) with 32 elements each, such that coefficients are generally ordered from lowest frequency to highest frequency in each array. In the scanning, the encoder uses a scan pattern for the 4×8 DCT. The encoder then entropy codes the one-dimensional arrays (1072, 1074) using a combination of run length coding (1080) and variable length encoding (1090) with one or more run/level/last tables (1085).

Figure 12:
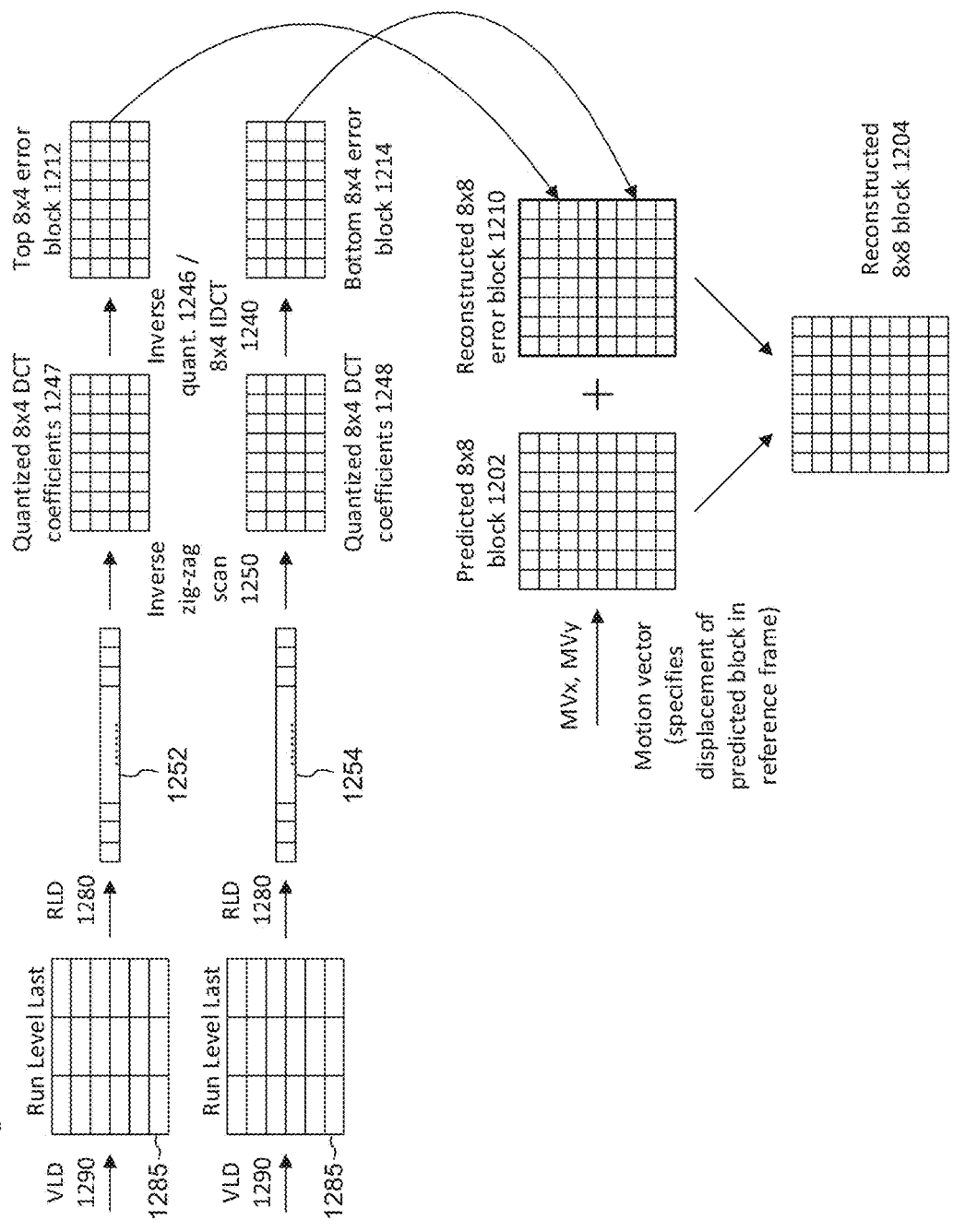
FIG. 12 is a diagram showing decompression and inverse transform coding of a block of prediction residuals using inverse sub-block transforms.

FIG. 12 shows decompression and inverse transform coding of an 8×8 prediction error block (1210) using two 8×4 IDCTs (1240) in this implementation. Decompression and inverse transform coding using the 4×8 IDCT use transposes at stages around the inverse frequency transform. Decompression and inverse transform coding using the 8×8 IDCT are shown in FIG. 5.

A video decoder entropy decodes one-dimensional arrays (1252, 1254) of quantized frequency coefficient values using a combination of run length decoding (1280) and variable length decoding (1290) with one or more run/level/last tables (1285). The decoder then scans (1250) the one-dimensional arrays (1252, 1254) into blocks of quantized DCT coefficients (1247, 1248). In the scanning, the encoder uses the scan pattern for the 8×4 DCT.

The decoder inverse quantizes (1246) the data and applies (1240) an 8×4 inverse DCT to the reconstructed frequency coefficients in each of the blocks, resulting in a reconstructed 8×4 error block (1212) for the top half of the error block (1210) and a reconstructed 8×4 error block (1214) for the bottom half of the error block (1210). The decoder then combines to top (1212) and bottom (1214) halves to form the reconstructed 8×8 error block (1210).

The decoder combines the reconstructed error block (1210) with a predicted block (1202) from motion compensation using motion information to form a reconstructed 8×8 block (1204). For example, the reconstructed 8×8 block (1204) is a reconstructed version of the current 8×8 block (1004) of FIG. 10.

2. Selection Using Closed Loop

FIGS. 13a through 13f show a closed loop technique (1300) for setting transform size(s) for a frame. In the closed loop technique (1300), the encoder applies each of 8×8, 8×4, and 4×8 transform sizes to the 8×8 blocks of a frame, computes distortion measures for each block with each transform size, computes signaling overhead for switching at different levels, and selects the transform size(s) and switching level(s) for the frame. In alternative embodiments, the encoder tests more or fewer transform sizes, tests different transform sizes, uses a closed loop technique on something other than a per frame basis, and/or uses different criteria to select transform size(s) and/or switching levels. In still other alternative embodiments, the encoder uses an open loop technique.

In the implementation illustrated in FIGS. 13a-13f, a frame includes multiple 4:2:0 macroblocks, and each macroblock is made up of six 8×8 blocks. Alternatively, another macroblock or block format is used.

With reference to FIG. 13a, with the closed loop technique (1300), the encoder selects the transform size(s) used in the frame. The transform size can be specified at the frame, macroblock or block levels. At the frame level, one of four options is specified: 1) all blocks in the frame use 8×8 DCT, 2) all blocks in the frame use 8×4 DCT, 3) all blocks in the frame use 4×8 DCT, or 4) the transform size is signaled at the macroblock level. If the transform type is signaled at the macroblock level, then at each macroblock one of four options is specified: 1) all blocks in the macroblock use 8×8 DCT, 2) all blocks in the macroblock use 8×4 DCT, 3) all blocks in the macroblock use 4×8 DCT, or 4) the transform size is signaled at the block level.

To start, the encoder initializes (1301) the variables costFrm8×8, costFrm8×4, costFrm4×8, and costFrmvar used to measure performance of the different transform sizes at the frame level, as described in Table 1.

TABLE 1

Frame-level Variables for Measuring Transform Performance

| Variable | Description |
| --- | --- |
| costFrm8×8 | Indicates the adjusted bit count for coding all macroblocks of the frame with an 8 × 8 DCT. |
| costFrm8×4 | Indicates the adjusted bit count for coding all macroblocks of the frame with an 8 × 4 DCT. |
| costFrm4×8 | Indicates the adjusted bit count for coding all macroblocks of the frame with an 4 × 8 DCT. |
| costFrmVar | Indicates the adjusted bit count for coding all macroblocks of the frame with transform sizes specified at the macroblock level or below. |
| FrameLevelTransformType | Indicates the best transform size for the frame. |
| SwitchAtMBLevel | Indicates whether the transform type is signaled at the macroblock or frame level. |
| costFrm | Indicates the adjusted bit count for the best transform type(s) including the overhead to signal the transform type at the frame level. |

Table 1 also lists three other variables (FrameLevelTransformType, SwitchAtMBLevel, and costFrm), which used in the closed loop evaluation as described below.

Figure 13B:
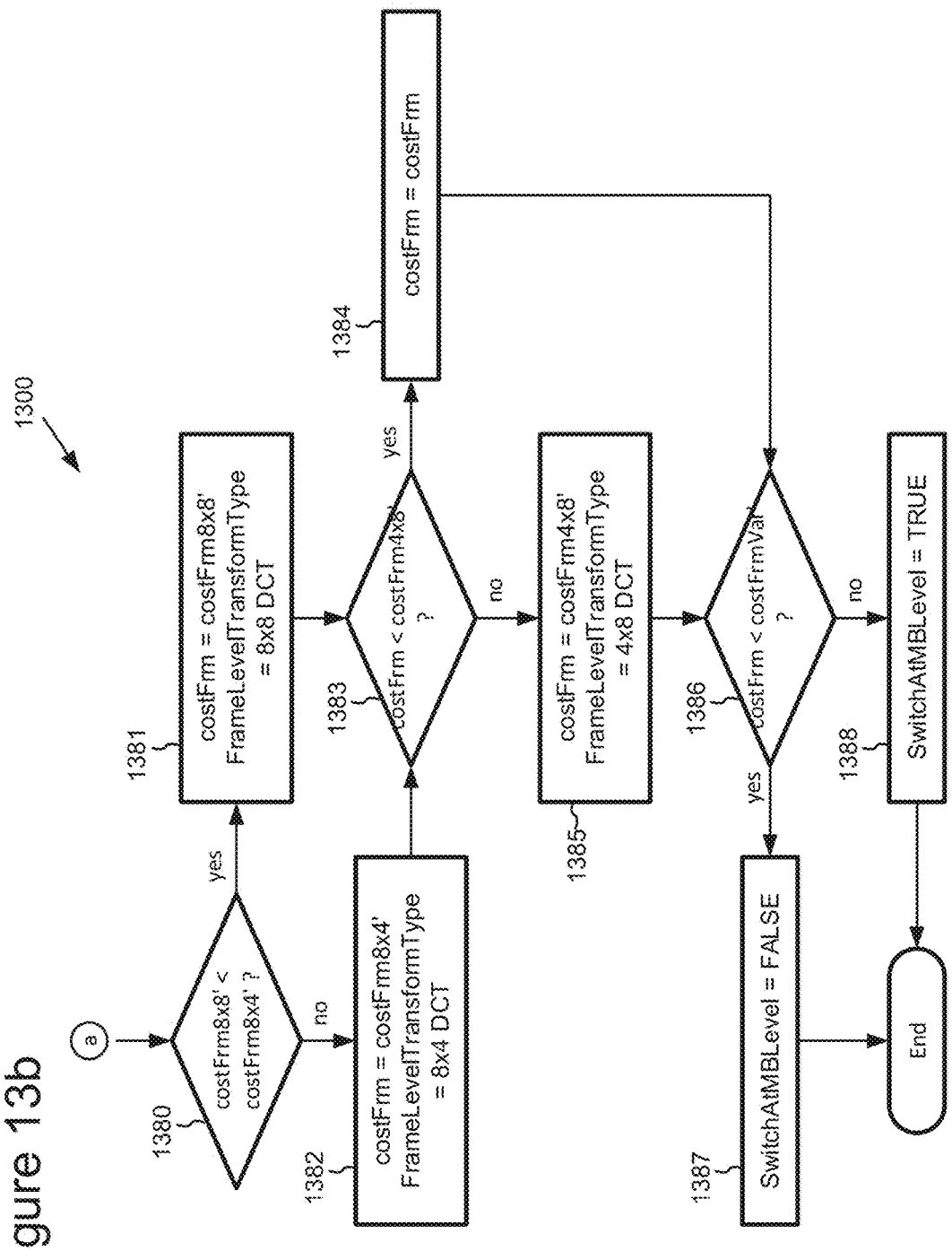
Figure 13D:
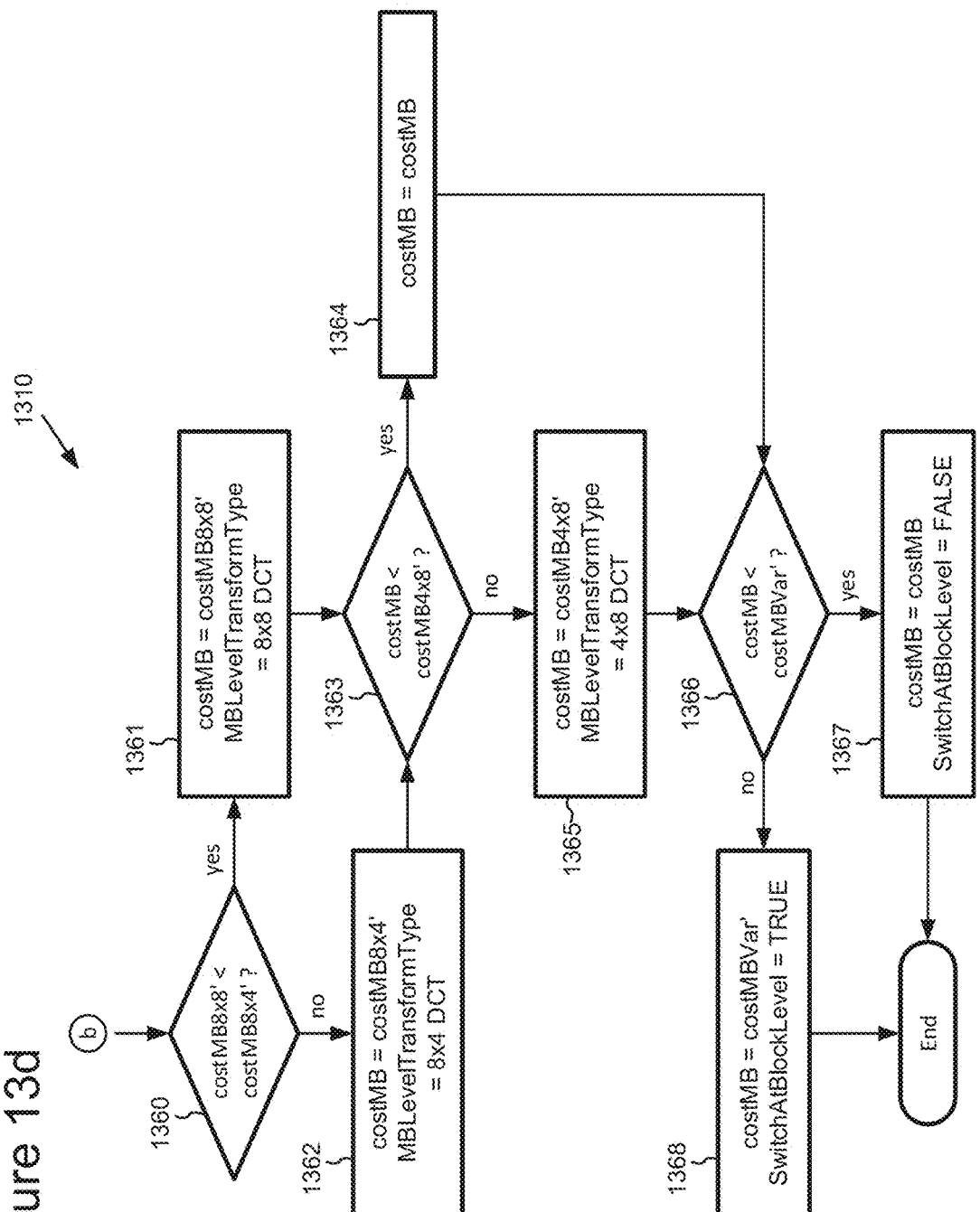

In a top-down, recursive process, the encoder accumulates adjusted bit counts for these values. The encoder performs (1310) the transforms of different sizes for a first macroblock in the frame, as shown in FIGS. 13c and 13d, and repeats when there are more macroblocks (1390) in the frame. For each macroblock, the encoder initializes (1311) the variables costMB8×8, costMB8×4, costMB4×8, and costMBvar used to measure performance of the different transform sizes at the macroblock level, as described in Table 2.

TABLE 2

MB-level Variables for Measuring Transform Performance

| Variable | Description |
| --- | --- |
| costMB8×8 | Indicates the adjusted bit count for coding all 6 blocks with an 8 × 8 DCT. |
| costMB8×4 | Indicates the adjusted bit count for coding all 6 blocks with an 8 × 4 DCT. |
| costMB4×8 | Indicates the adjusted bit count for coding all 6 blocks with an 4 × 8 DCT. |
| costMBVar | Indicates the adjusted bit count for coding all 6 blocks with transform sizes specified for each block at the block level. |
| MBLevelTransformType | Indicates the best transform size for the macroblock. |
| SwitchAtBlockLevel | Indicates whether the transform type is signaled at the block or macroblock level. |
| costMB | Indicates the adjusted bit count for the best transform type(s) including the overhead to signal the transform type at the macroblock level. |

Table 2 also lists three other variables (MBLevelTransformType, SwitchAtBlockLevel, and costMB), which used in the closed loop evaluation as described below.

Figure 13E:
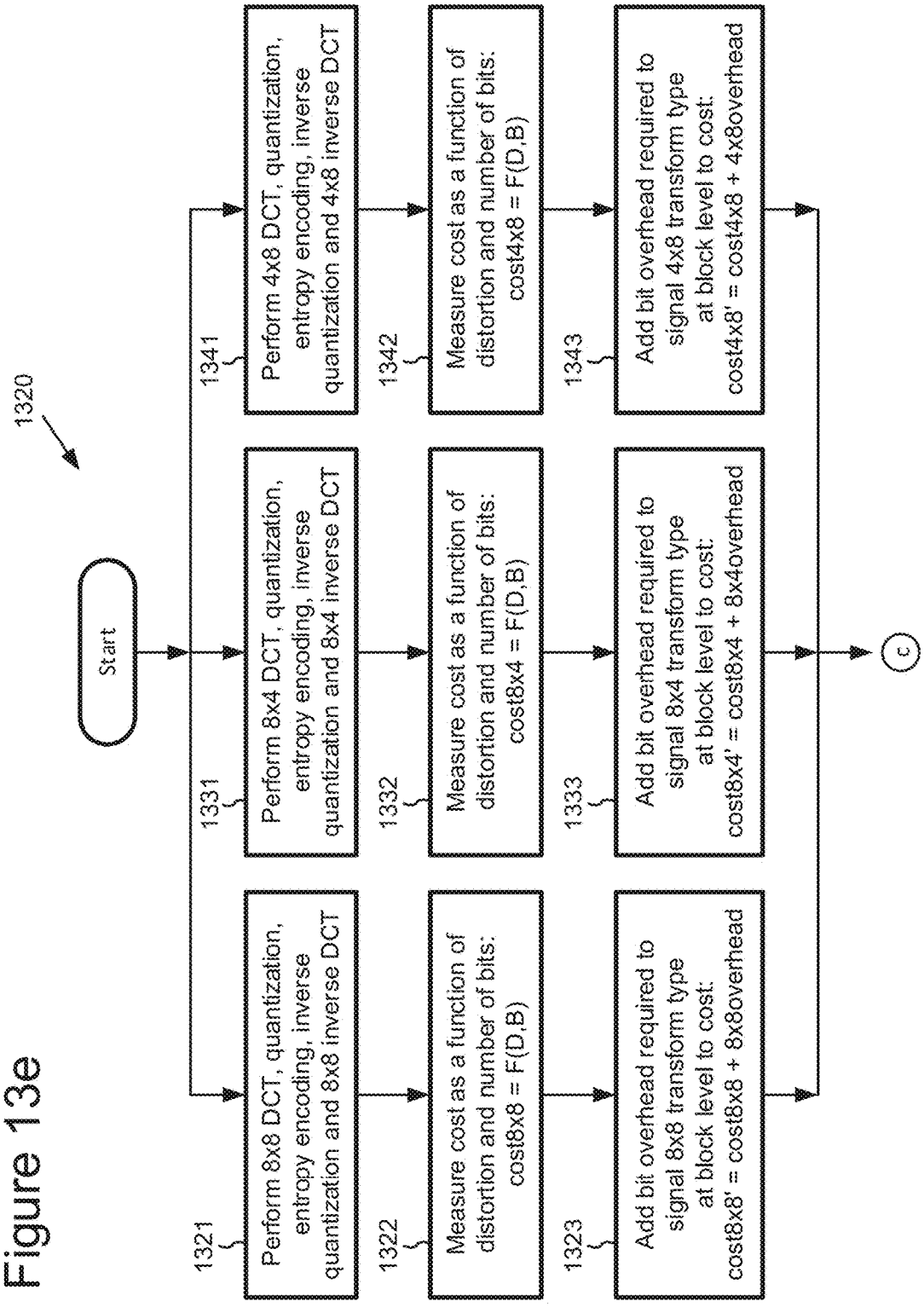
Figure 13F:
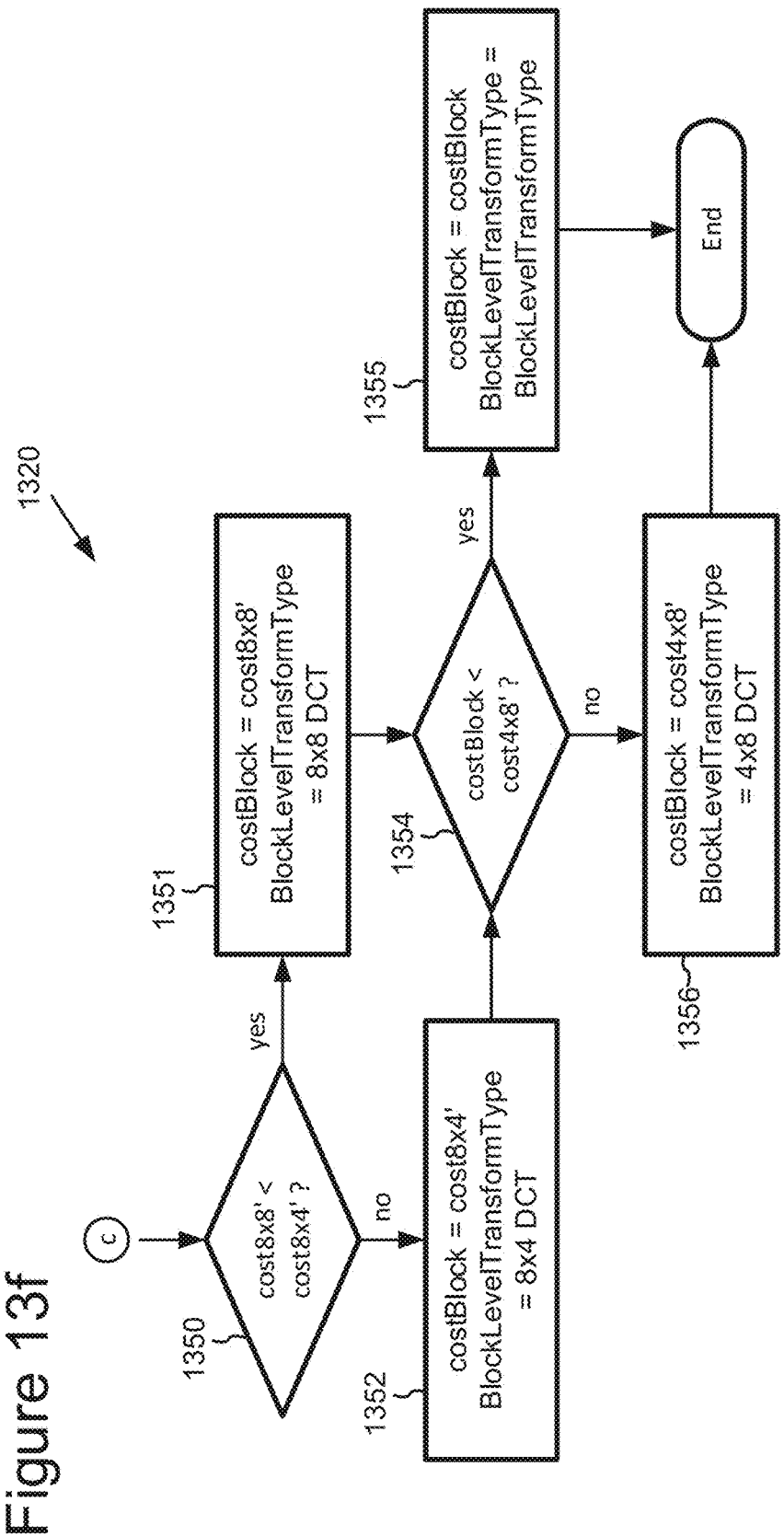

For each of the 6 blocks in the macroblock, the encoder accumulates adjusted bit counts for these values. The encoder performs (1320) the transforms of different sizes for a first block in the macroblock, as shown in FIGS. 13e and 13f, and repeats when there are more blocks (1391) in the macroblock. For each block, the encoder computes a rate-distortion measure.

a. Block Level

The encoder performs (1321) the full coding and reconstruction processes on the block using the 8×8 DCT. The encoder applies the 8×8 DCT, quantizes the DCT coefficients, entropy codes the coefficients (e.g., run level+Huffman), inverse quantizes the coefficients, and applies an 8×8 inverse DCT. The quantization introduces distortion that is subsequently measured for the block. The entropy coding results in output bits for the block that are subsequently counted.

The encoder also performs (1331, 1341) the full coding and reconstruction processes on the block using two 8×4 DCTs and two 4×8 DCTs, respectively.

The encoder measures (1322) the cost associated with the 8×8 DCT as a function of the distortion of the block and the number of bits required to encode the block. The encoder also measures (1332, 1342) the cost associated with the two 8×4 DCTs and two 4×8 DCTs, respectively. The encoder computes the distortion as the mean squared error ["MSE"] between the 64 original DCT coefficients and the 64 inverse quantized coefficients. Alternatively, the encoder uses another distortion measure such as sum of absolute differences ["SAD"], a perceptual distortion measure, or another error measure.

After the encoder obtains the bit count and distortion for each transform size, the encoder needs to make a decision about which transform size results in the most efficient compression. The encoder accounts for both the number of bits and the distortion using cost function variables cost8×8, cost8×4, and cost4×8, which are described in Table 3.

TABLE 3

Block-level Variables for Measuring Transform Performance

| Variable | Description |
| --- | --- |
| cost8×8 | Indicates the adjusted bit count for coding the block with an 8 × 8 DCT. |
| cost8×4 | Indicates the adjusted bit count for coding the block with an 8 × 4 DCT. |
| cost4×8 | Indicates the adjusted bit count for coding the block with an 4 × 8 DCT. |
| BlockLevelTransformType | Indicates the best transform type for the block. |
| costBlock | Indicates the adjusted bit count for the best transform type including the overhead to signal the transform type at the block level |

Table 3 also lists two other variables (BlockLevelTransformType, costBlock), which are used in the closed loop evaluation as described below.

The cost function may readjust the number of bits for a transform size depending on the distortion for that transform size. For example, suppose transform coding a block with different transform sizes resulted in the following bit counts and distortions.

TABLE 4

Example Bit Counts and Distortions

| Transform Size | Bit Count | Distortion |
| --- | --- | --- |
| 8 × 8 | 48 | 1000 |
| 8 × 4 (aggregates of sub-blocks) | 45 | 1100 |
| 4 × 8 (aggregates of sub-blocks) | 44 | 1200 |

If the encoder considered only the bit counts, the encoder would choose the 4×8 transform since it was encoded in the fewest bits. However, the 4×8 transform also has the highest distortion. To more accurately determine which transform size is the best, the encoder also considers the distortion. In one implementation, the 8×8 bit count is taken as the baseline, and the bit counts for the 8×4 and 4×8 transforms are readjusted as shown in Table 5 and the following equations.

TABLE 5

Variables in Rate-Distortion Adjustments

| Variable | Description |
| --- | --- |
| D8×8 | The 8 × 8 DCT distortion (MSE between the 64 original and inverse quantized 8 × 8 DCT coefficients). |

TABLE 5-continued

Variables in Rate-Distortion Adjustments

| Variable | Description |
| --- | --- |
| D8×4 | The 8 × 4 DCT distortion (MSE between the 64 original and inverse quantized 8 × 4 DCT coefficients). |
| D4×8 | The 4 × 8 DCT distortion (MSE between the 64 original and inverse quantized 4 × 8 DCT coefficients). |
| FScale | 100/(quantizer step size) |

For the adjusted 8×4 bit count, the following equations are used.

$$fVal8\times4=(sqrt(D8\times4)-sqrt(D8\times8))*fScale \quad (1),$$

$$iVal8\times4=Int(fVal8\times4) \quad (2),$$

$$cost8\times4=cost8\times4+iVal8\times4 \quad (3),$$

where Int( ) is a function that rounds the input to the nearest integer. For the adjusted 4×8 bit count, the following equations are used.

$$fVal4\times8=(sqrt(D4\times8)-sqrt(D8\times8))*fScale \quad (4),$$

$$iVal4\times8=Int(fVal4\times8); \quad (5),$$

$$cost4\times8=cost4\times8+iVal4\times8 \quad (6).$$

Once the bit counts for each transform size have been readjusted, the one with the lowest bit count is assumed to be the best from a rate-distortion perspective. In an alternative embodiment, the encoder uses another cost function that relates cost and distortion as a single measure. In other alternative embodiments, the encoder uses a cost function that considers only rate or only distortion.

For each block, the encoder computes five values for the variables shown in Table 3. (Some of the values are also used in the macroblock level as described in the next section.) As initially computed from bit counts and distortion, the values cost8×8, cost8×4 and cost4×8 do not include the overhead required to signal the transform type at the block level. The encoder adds (1323, 1333, 1343) the bit overhead required to signal transform size at the block level for the different transform sizes.

$$cost8\times8'=cost8\times8+8\times8overhead \quad (7),$$

$$cost8\times4'=cost8\times4+8\times4overhead \quad (8),$$

$$cost4\times8'=cost4\times8+4\times8overhead \quad (9),$$

where the overhead measures indicate the overhead for switching flags for the different transform types at the block level.

The encoder computes the values for costBlock and BlockLevelTransform Type as follows. The encoder (1350) compares cost8×8' to cost8×4' to find the best transform size between the two of them. The encoder sets (1351, 1352) costBlock and BlockLevelTransformType to either the 8×8 size or the 8×4 size, respectively. The encoder then compares (1354) the best transform size so far to cost4×8' to find the best transform size between the two of them. The encoder keeps (1355) the current values or sets (1356) costBlock and BlockLevelTransformType to the 4×8 size. Alternatively, the encoder uses other conditional logic to find values for costBlock and BlockLevelTransformType.

b. Macroblock Level

Returning to FIGS. 13c and 13d, the encoder accumulates (1358) the block costs for the block with the four running totals for the macroblock: costMB8×8, costMB8×4, costMB4×8, and costMBvar. The encoder then performs (1320) the transforms of different sizes for the other blocks in the macroblock. Thus, the value of costBlock is accumulated for the six blocks that make up the macroblock. Likewise, cost8×8, cost8×4 and cost4×8 are accumulated for the six blocks.

For each macroblock, the encoder computes seven values for the variables shown in Table 2. (Some of the values are also used in the frame level as described in the next section.) As initially computed for the macroblock, the values costMBvar, costMB8×8, costMB8×4, and costMB4×8 do not include the overhead required to signal the transform size at the macroblock level. The encoder adds (1358) the number of bits required to signal each possible choice to the bit counts.

$$costMB8\times8'=costMB8\times8+8\times8overhead \qquad (10),$$

$$costMB8\times4'=costMB8\times4+8\times4overhead \qquad (11),$$

$$costMB4\times8'=costMB4\times8+4\times8overhead \qquad (12),$$

$$costMBvar'=costMBvar+Varoverhead \qquad (13),$$

where the overhead measures indicate the overhead for switching flags for the different transform types at the macroblock level. For costMBvar', the overhead measure also indicates the overhead for switching flags at the block level.

The encoder then computes values for costMB, MBLevelTransformType, and SwitchAtBlockLevel as follows. Basically, the encoder decides whether to code the macroblock with a single transform size for all blocks in the macroblock or to allow each block in the macroblock to signal its own transform size. The encoder compares (1360) costMB8×8' to costMB8×4' to find the best transform size between the two of them. The encoder sets (1361, 1362) costMB and MBLevelTransformType to either the 8×8 size or the 8×4 size, respectively. The encoder then compares (1363) the best transform size so far costMB to costMB4×8' to find the best transform size between the two of them. The encoder keeps (1364) the current values or sets (1365) costMB and MBLevelTransformType to the 4×8 size. The encoder then compares (1366) the best transform size so far costMB to costMBVar' to find the best transform size between the two of them. If costMB is less than costMBVar', the encoder keeps (1367) the current value for costMB and sets SwitchAtBlockLevel to FALSE, which mean that the switching level is macroblock level for the macroblock. Otherwise, the encoder sets (1368) costMB to costMBVar' and sets SwitchAtBlockLevel to TRUE, which means that the switching level is block level for the macroblock. Alternatively, the encoder uses other conditional logic to find values for costMB, MBLevelTransformType, and SwitchAtBlockLevel.

c. Frame Level

Returning to FIGS. 13a and 13b, the encoder accumulates (1369) the macroblock costs for the macroblock with the four running totals for the frame: costFrm8×8, costFrm8×4, costFrm4×8, and costFrmvar. The encoder then performs (1310) the transforms of different sizes for the other macroblocks in the frame. Thus, the value of costMB is accumulated for the macroblocks that make up the frame. Likewise, costMB8×8, costMB8×4 and costMB4×8 are accumulated for the macroblocks that make up the frame.

For each frame, the encoder computes seven values for the variables shown in Table 1. As initially computed for the frame, costFrm8×8, costFrm8×4, costFrm4×8 and costFrmVar do not include the overhead required to signal the transform at the frame level. The encoder adds (1358) the number of bits required to signal each possible choice to the bit counts.

$$costFrm8\times8'=costFrm8\times8+8\times8overhead \qquad (14),$$

$$costFrm8\times4'=costFrm8\times4+8\times4overhead \qquad (15),$$

$$costFrm4\times8'=costFrm4\times8+4\times8overhead \qquad (16),$$

$$costFrmvar'=costFrmvar+Varoverhead \qquad (17),$$

where the overhead measures indicate the overhead for switching flags for the different transform types at the frame level. For costFrmvar', the overhead measure also indicates the overhead for switching flags at the macroblock/block level.

The encoder then computes values for costFrm, FrameLevelTransform Type, and SwitchAtMBLevel as follows. Basically, the encoder decides whether to code the frame with a single transform type for all blocks in the frame or to allow each macroblock to signal its own transform size. The encoder compares (1380) costFrm8×8' to costFrm8×4' to find the best transform size between the two of them. The encoder sets (1381, 1382) costFrm and FrameLevelTransformType to either the 8×8 size or the 8×4 size, respectively. The encoder then compares (1383) the best transform size so far costFrm to costFrm4×8' to find the best transform size between the two of them. The encoder keeps (1384) the current values or sets (1385) costFrm and FrameLevelTransformType to the 4×8 size. The encoder then compares (1386) the best transform size so far costFrm to costFrmVar' to find the best transform size between the two of them. If costFrm is less than costFrmVar', the encoder sets (1387) SwitchAtMBLevel to FALSE. Otherwise, the encoder sets (1388) SwitchAtMBLevel to TRUE. Alternatively, the encoder uses other conditional logic to find values for costFrm, FrameLevelTransformType, and SwitchAtMBLevel.

3. Signaling Switches

Continuing the example of FIGS. 13a through 13f, if the value of SwitchAtMBLevel is TRUE, the transform type is signaled at the macroblock level. Another signal present at each macroblock indicates whether a single transform type is used for all blocks in the macroblock or whether each block signals its own transform type. This is determined by the value of SwitchAtBlockLevel, as previously described. If SwitchAtBlockLevel is TRUE, of transform type specified by BlockLevelTransformType as determined at the block level is used for that block. If SwitchAtBlockLevel is FALSE, the transform type specified by MBLevelTransformType as determined at the macroblock level is used for all the blocks in the macroblock.

If the value of SwitchAtMBLevel is FALSE, the transform type used for all blocks in the frame is signaled at the frame level. The transform type is indicated by the value of FrameLevelTransformType.

Figure 14:
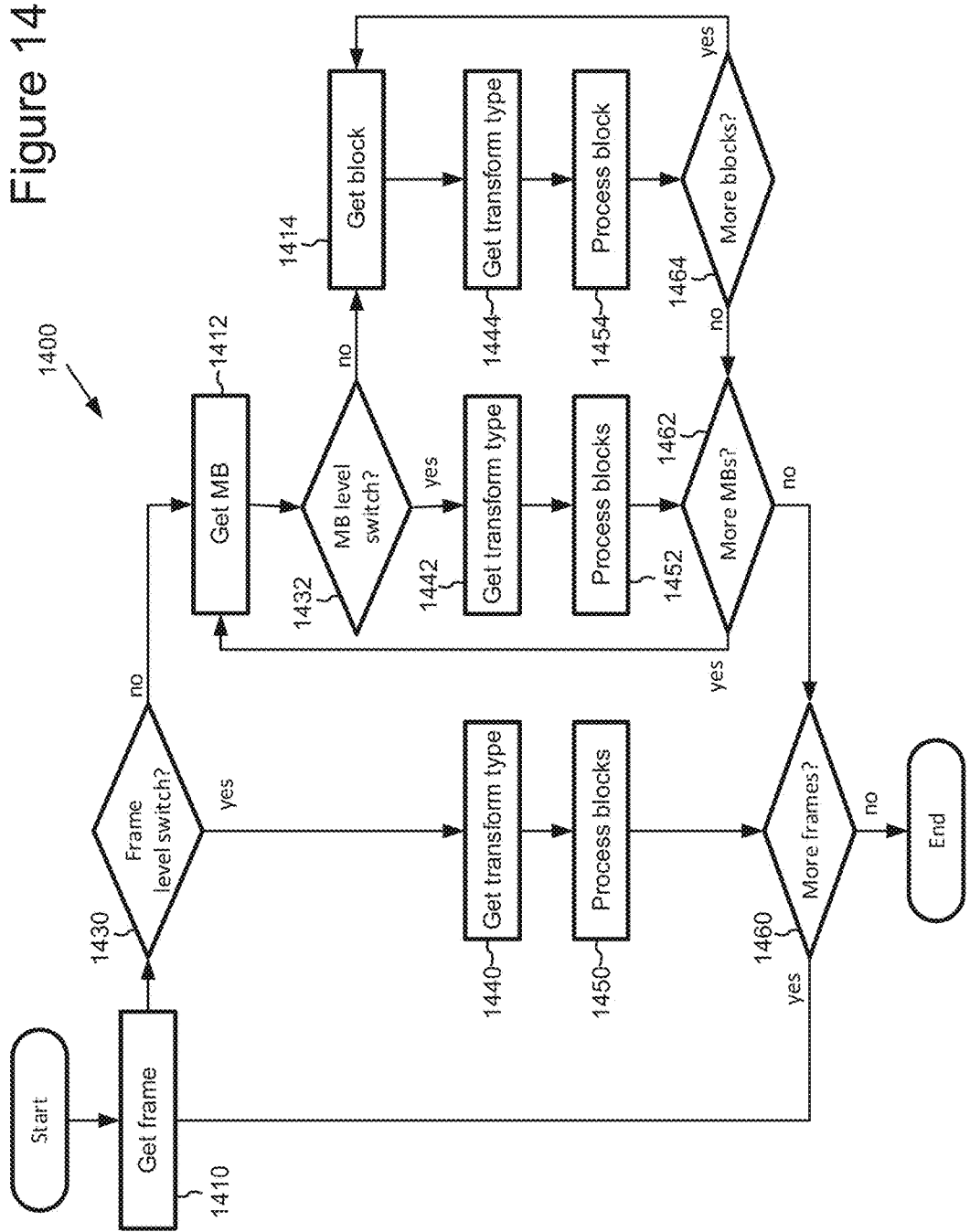
FIG. 14 is a flowchart showing a technique for switching transform sizes in a video decoder.

FIG. 14 shows a technique for switching transform sizes in a video decoder. For the sake of simplicity, FIG. 14 does not show the various ways in which the technique (1400) can be used in conjunction with other techniques.

A decoder gets (1410) a video frame, for example, a predicted video frame. The decoder determines (1430) whether frame-level switch information is used to indicate a transform size for the frame. If so, the decoder gets (1440) the transform type for the frame and processes (1450) the blocks of the frame. For example, the decoder determines whether the transform type is 8×8, 8×4, or 4×8, and then applies an 8×8, 8×4, or 4×8 inverse DCT to the blocks of the frame. The decoder determines (1460) whether there are any more frames. If not, the technique ends. If so, the decoder gets (1410) the next frame and determines (1430) whether frame-level switch information for the frame is used to indicate a transform size for the frame.

If the frame-level switch information is not used to indicate a transform size for the frame, the decoder gets (1412) a macroblock for the frame. The decoder determines (1432) whether macroblock-level switch information is used to indicate a transform size for the macroblock. If so, the decoder gets (1442) the transform type for the macroblock and processes (1452) the blocks of the macroblock. The decoder determines (1462) whether there are any more macroblocks in the frame. If not, the decoder determines (1460) whether there are any more frames. If there are more macroblocks in the frame, the decoder gets (1412) the next macroblock and determines (1432) whether macroblock-level switch information for the macroblock is used to indicate a transform size for the macroblock.

If macroblock-level switch information is not used to indicate a transform size for the macroblock, the decoder gets (1414) a block for the macroblock. The decoder gets (1444) the transform type for the block and processes (1454) the block. The decoder determines (1464) whether there are any more blocks in the macroblock. If not, the decoder determines (1462) whether there are any more macroblocks in the frame. If there are more blocks in the macroblock, the decoder gets (1414) the next block and gets (1444) its transform type.

In alternative embodiments, a video encoder and decoder use other switching logic to switch between transform sizes.

Table 6 shows entropy codes for transform types in one implementation.

TABLE 6

Entropy Codes for Transform Types

| VLC | Transform Type |
|---|---|
| 0 | 8 × 8 DCT |
| 10 | 8 × 4 DCT |
| 11 | 4 × 8 DCT |

Other implementations use different entropy codes and/or different code tables for different transform sizes.

4. Scan Patterns

Following transform coding and quantization in the video encoder, the encoder scans one or more two-dimensional blocks of quantized frequency coefficients into one or more one-dimensional arrays for entropy encoding. The video decoder scans one or more one-dimensional arrays into one or more two-dimensional blocks before inverse quantization. A scan pattern indicates how elements of a two-dimensional block are ordered in a corresponding one-dimensional array.

Figure 15:
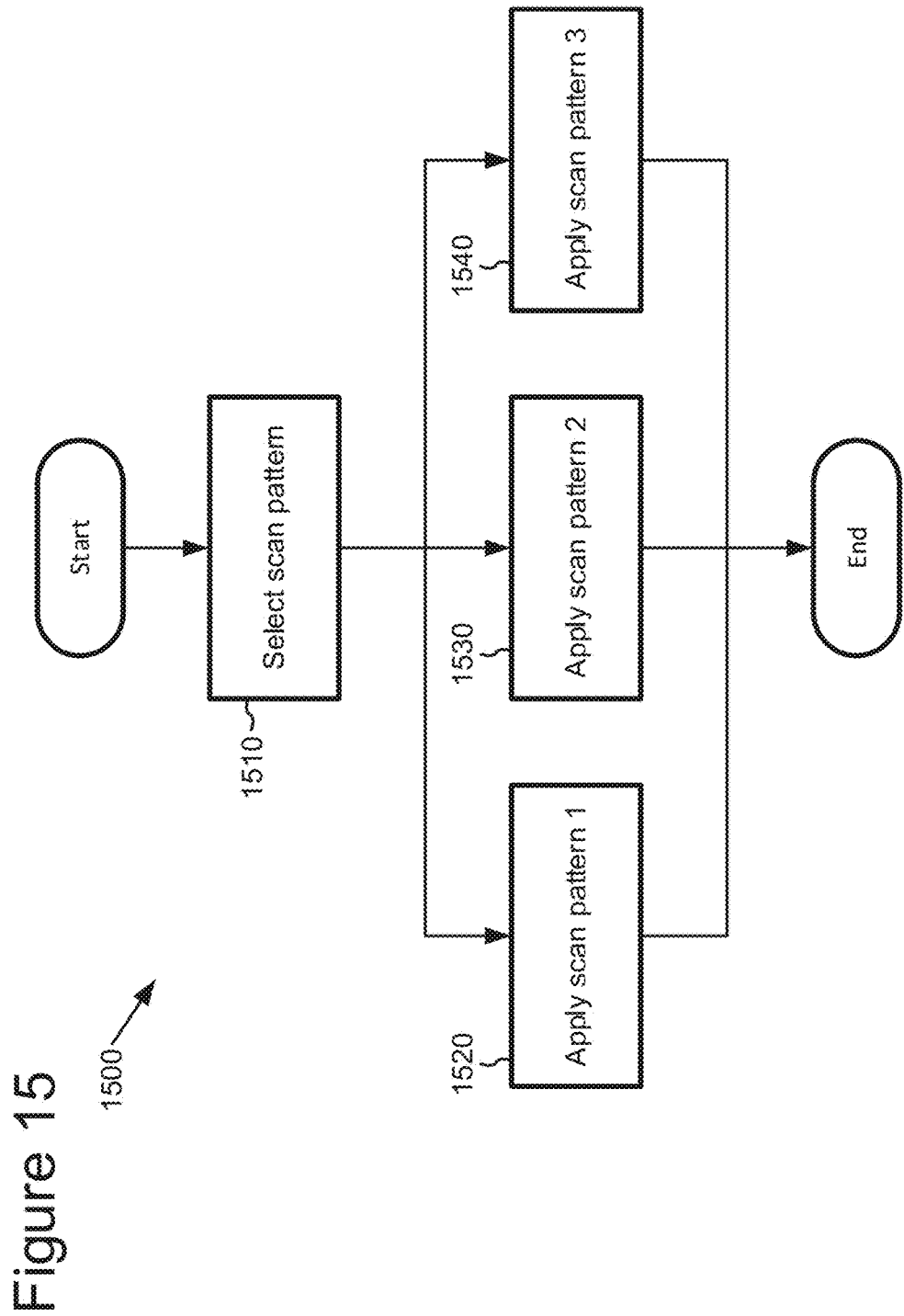
FIG. 15 is a flowchart showing a technique for selecting one of multiple available scan patterns for a prediction residual for a motion-compensated block.

In some embodiments, the encoder and decoder select between multiple available scan patterns for a residual for a motion-compensated block. Both the encoder and the decoder use one or more scan patterns, and use different scan patterns for different transform sizes. FIG. 15 shows a technique (1500) for selecting one of multiple available scan patterns for frequency coefficients of a prediction residual for a motion-compensated block. For the sake of simplicity, FIG. 15 does not show the various ways in which the technique (1500) can be used in conjunction with other techniques.

FIG. 15 shows three available scan patterns, which in this context are, for example, for 8×8, 8×4, and 4×8 DCTs, respectively. FIGS. 16a-16c show 8×8 (1601), 8×4 (1602), and 4×8 (1603) scan patterns, respectively, in one implementation. Other implementations use different scan patterns.

The encoder/decoder selects (1510) a scan pattern for scanning the residual block. For example, an encoder/decoder selects a scan pattern based upon transform size for the block. The encoder/decoder then applies (1520, 1530, or 1540) the selected scan pattern by reordering elements of a two-dimensional block into a one-dimensional array, or vice versa.

Alternatively, the encoder/decoder selects between more or fewer scan patterns and/or selects a scan patter based upon other criteria.

5. Sub-Block Pattern Codes

In addition to selecting a transform size and applying the frequency transform to a prediction residual block, the encoder indicates in the output bitstream what the transform size is for the block. For example, the encoder indicates whether the DCT used on a block is an 8×8, 8×4, or 4×8 DCT.

In some embodiments, if the transform size is a sub-block transform size, the encoder also outputs a sub-block pattern code that indicates the presence or absence of information for the sub-blocks of a block. For example, for the 8×4 DCT, the sub-block transform code indicates the presence or absence of information for 1) only the bottom 8×4 sub-block; 2) only the top 8×4 sub-block; or 3) both the top and the bottom sub-blocks. For the 4×8 DCT, the sub-block transform code indicates the presence or absence of information for 1) only the left 4×8 sub-block; 2) only the right 4×8 sub-block; or 3) both the left and the right sub-blocks. Table 7 shows entropy codes for sub-block pattern codes in one implementation.

TABLE 7

Entropy Codes for Sub-block Pattern Codes

| SUBBLK-PAT VLC | 8 × 4 Sub-block Pattern | | 4 × 8 Sub-block Pattern | |
|---|---|---|---|---|
| | Top | Bottom | Left | Right |
| 0 | | X | | X |
| 10 | X | X | X | X |
| 11 | X | | X | |

The sub-block pattern codes are used at the block level, and only when the block uses a sub-block transform size (e.g., not 8×8 DCT for an 8×8 block). Other implementations use other entropy codes and/or use sub-block pattern codes differently.

In the encoder, the condition for whether to output information for a sub-block is implementation-dependent. For example, with the sub-block pattern code, the encoder indicates which of the sub-blocks of the block have at least one non-zero coefficient. For a sub-block with only zero-value coefficients, the encoder sends only the sub-block pattern code, and not other information for the sub-block, which reduces bitrate. Alternatively, the encoder uses another condition (e.g., mostly zero-value coefficients) to set the values of sub-block pattern codes.

Figure 17:
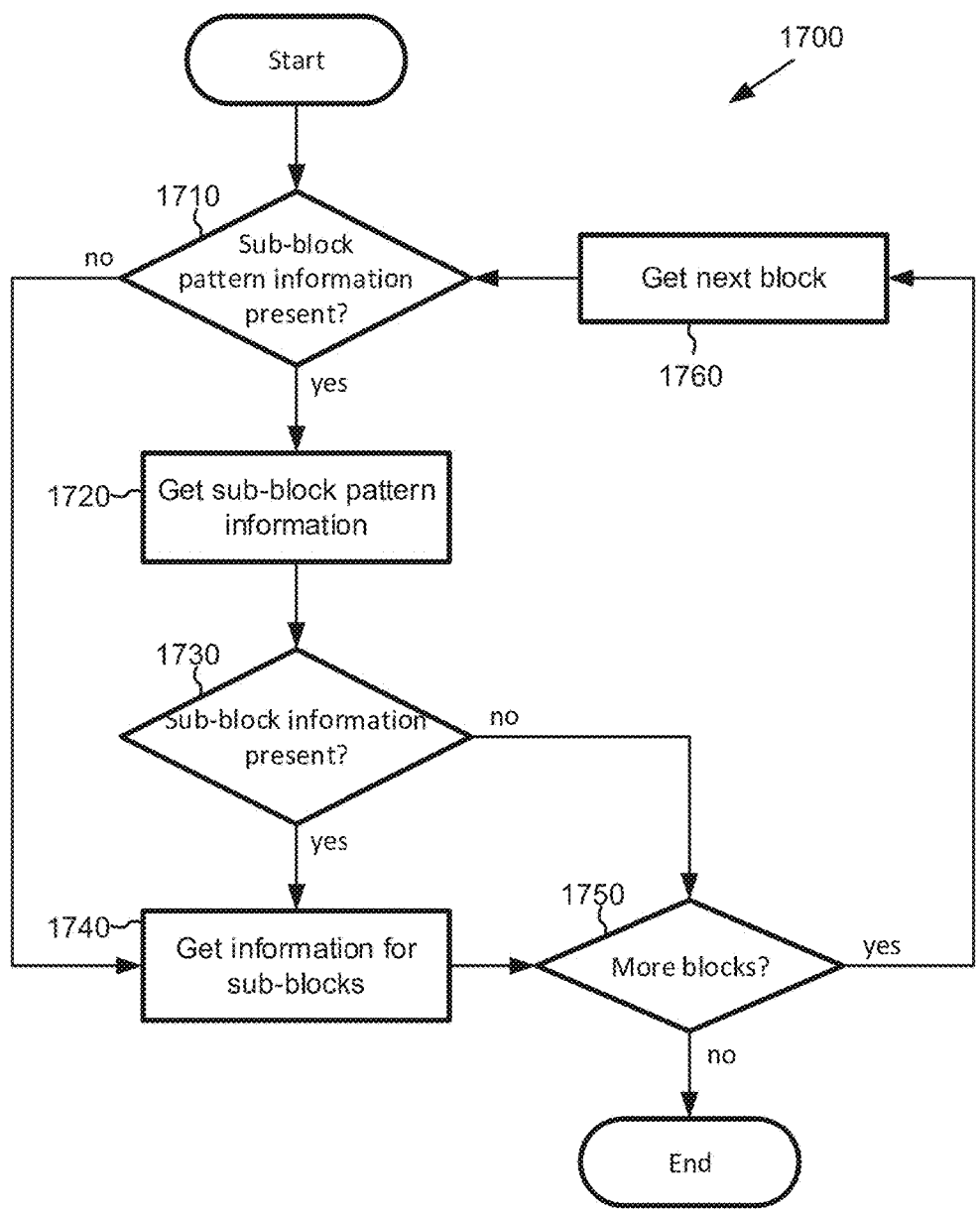
FIG. 17 is a flowchart showing a technique for using sub-block pattern codes in a video decoder.

FIG. 17 shows a technique for decoding of sub-blocks using pattern information. For the sake of simplicity, FIG. 17 does not show the various ways in which the technique (1700) can be used in conjunction with other techniques.

The decoder determines (1710) whether sub-block pattern information is present for a block. For example, in one implementation, if the transform size is full block (e.g., 8×8), the bitstream does not include a sub-block pattern code for the block.

If sub-block pattern information is present for the block, the decoder gets (1720) the sub-block pattern information (e.g., sub-block pattern code) for the block. The decoder then determines (1730) whether sub-block information is present for the sub-blocks of the block. For example, the decoder checks the sub-block pattern code. If information is present for at least one sub-block, the decoder gets (1740) the information for the sub-blocks that have information. For example, the decoder gets information for the top half, bottom half, or both top and bottom halves of a 8×8 block split into 8×4 sub-blocks. If the sub-block pattern indicates that no information is present for the sub-blocks of the block, the decoder goes to the next block, if present.

If sub-block pattern information is not present for the block, the encoder skips the steps 1720 and 1730, and gets (1740) information for the block.

The decoder then determines (1750) whether there are any more blocks to be decoded. If not, the technique ends. If so, the decoder gets (1760) the next block and determines (1710) whether sub-block pattern information is present for it.

In alternative embodiments, the encoder and decoder use other techniques to signal the presence or absence of sub-block information with sub-block pattern codes.

C. Loop Filtering

Quantization and other lossy processing of prediction residuals can cause blocky artifacts in reference frames that are used for motion estimation/compensation for subsequent predicted frames. In one or more embodiments, a video encoder processes a reconstructed frame to reduce blocky artifacts prior to motion estimation using the reference frame. A video decoder processes the reconstructed frame to reduce blocky artifacts prior to motion compensation using the reference frame. With deblocking, a reference frame becomes a better reference candidate to encode the following frame. Thus, using the deblocking filter improves the quality of motion estimation/compensation, resulting in better prediction and lower bitrate for prediction residuals. For additional detail about using a deblocking filter in motion estimation/compensation in some embodiments, see U.S. patent application Ser. No. aa/bbb,ccc, entitled "Motion Compensation Loop With Filtering," filed concurrently herewith.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer system comprising
one or more processors and memory,
wherein the computer system Implements a video decoder configured to perform operations to decode one or more video frames, the operations comprising:
receiving encoded data in a bitstream, wherein the encoded data includes sub-block pattern Information,
the sub-block pattern information indicating an information pattern for presence or absence in the bitstream of prediction residual data for plural sub-blocks of a block of the one or more video frames; and
decoding the encoded data to reconstruct the one or more video frames using a variable-block-size inverse frequency transform,
wherein the decoding includes, for a given sub-block of the respective sub-blocks of the block:
using the sub-block pattern information to determine that the given sub-block has prediction residual data in the bitstream;
getting, from the encoded data in the bitstream, encoded transform coefficients for the given sub-block;
entropy decoding the encoded transform coefficients for the given sub-block; inverse quantizing the transform coefficients for the given sub-block;
with the variable-block-size Inverse frequency transform, converting the transform coefficients for the given sub-block to prediction residual values for the given sub-block; and
combining the prediction residual values for the given sub-block with predicted values for the given sub-block.

2. The computer system of claim 1, wherein the block is an 8×8 block and the plural sub-blocks are 4×4 sub-blocks.

3. The computer system of claim 1, wherein the variable-block-size inverse frequency transform uses a transform size selected from among plural available transform sizes.

4. The computer system of claim 3, wherein the plural available transform sizes include 8×8 and 4×4.

5. The computer system of claim 1, wherein, for each of the respective sub-blocks of the block, if the sub-block has at least one non-zero transform coefficient, the sub-block pattern information indicates presence in the bitstream of prediction residual data for that sub-block.

6. The computer system of claim 1, wherein the decoding further includes: selecting a scan pattern from among multiple scan patterns; and using the selected scan pattern to reorder the transform coefficients for the given sub-block from a one-dimensional array to a two-dimensional array.

7. The computer system of claim 1, wherein the decoding further includes: performing motion-compensated prediction to determine predicted values for the block, the predicted values for the block including the predicted values for the given sub-block.

8. In a computer system that Implements a video decoder, a method comprising:
receiving encoded data in a bitstream, wherein the encoded data includes sub-block pattern information,
the sub-block pattern information Indicating an information pattern for presence or absence in the bitstream of prediction residual data for plural sub-blocks of a block of a video frame; and decoding the encoded data to reconstruct the one or more video frames using a variable-block-size inverse frequency transform, wherein the decoding includes, for a given sub-block of the respective sub-blocks of the block:

using the sub-block pattern information to determine that the given sub-block has prediction residual data in the bitstream;

getting, from the encoded data in the bitstream, encoded transform coefficients for the given sub-block;

entropy decoding the encoded transform coefficients for the given sub-block;

inverse quantizing the transform coefficients for the given sub-block;

with the variable-block-size inverse frequency transform, converting the transform coefficients for the given sub-block to prediction residual values for the given sub-block; and combining the prediction residual values for the given sub-block with predicted values for the given sub-block.

9. The method of claim 8, wherein the block is an 8×8 block and the plural sub-blocks are 4×4 sub-blocks.

10. The method of claim 8, wherein the variable-block-size Inverse frequency transform uses a transform size selected from among plural available transform sizes.

11. The method of claim 10, wherein the plural available transform sizes include 8×8 and 4×4.

12. The method of claim 8, wherein, for each of the respective sub-blocks of the block, if the sub-block has at least one non-zero transform coefficient, the sub-block pattern information indicates presence in the bitstream of prediction residual data for that sub-block.

13. The method of claim 8, wherein the decoding further includes: selecting a scan pattern from among multiple scan patterns; and using the selected scan pattern to reorder the transform coefficients for the given sub-block from a one-dimensional array to a two-dimensional array.

14. The method of claim 8, wherein the decoding further includes: performing motion-compensated prediction to determine predicted values for the block, the predicted values for the block including the predicted values for the given sub-block.

15. One or more computer-readable media having stored thereon computer executable instructions for causing one or more processing units, when programmed thereby, to perform operations, the one or more computer-readable media being selected from the group consisting of non-volatile memory, optical media, and magnetic media, the operations comprising:

receiving encoded data in a bitstream, wherein the encoded data includes sub-block pattern information, the sub-block pattern Information Indicating an information pattern for presence or absence in the bitstream of prediction residual data for plural sub-blocks of a block of a video frame; and decoding the encoded data to reconstruct the one or more video frames using a variable-block-size inverse frequency transform, wherein the decoding includes, for a given sub-block of the respective sub-blocks of the block:

using the sub-block pattern information to determine that the given sub-block has prediction residual data in the bitstream;

getting, from the encoded data in the bitstream, encoded transform coefficients for the given sub-block;

entropy decoding the encoded transform coefficients for the given sub-block; inverse quantizing the transform coefficients for the given sub-block;

with the variable-block-size inverse frequency transform, converting the transform coefficients for the given sub-block to prediction residual values for the given sub-block; and combining the prediction residual values for the given sub-block with predicted values for the given sub-block.

16. The one or more computer-readable media of claim 15, wherein the block is an 8×8 block and the plural sub-blocks are 4×4 sub-blocks.

17. The one or more computer-readable media of claim 15, wherein the variable-block-size inverse frequency transform uses a transform size selected from among plural available transform sizes.

18. The one or more computer-readable media of claim 17, wherein the plural available transform sizes Include 8×8 and 4×4.

19. The one or more computer-readable media of claim 15, wherein, for each of the respective sub-blocks of the block, if the sub-block has at least one non-zero transform coefficient, the sub-block pattern information Indicates presence in the bitstream of prediction residual data for that sub-block.

20. The one or more computer-readable media of claim 15, wherein the decoding further includes: selecting a scan pattern from among multiple scan patterns; and using the selected scan pattern to reorder the transform coefficients for the given sub-block from a one-dimensional array to a two-dimensional array.

* * * * *

UNITED STATES PATENT AND TRADEMARK OFFICE
CERTIFICATE OF CORRECTION

PATENT NO. : 10,531,117 B2  
APPLICATION NO. : 16/197156  
DATED : January 7, 2020  
INVENTOR(S) : Holcomb et al.

Page 1 of 1

It is certified that error appears in the above-identified patent and that said Letters Patent is hereby corrected as shown below:

In the Claims

Claim 8, Column 27, Lines 1-2, "the one or more video frames," should read --the video frame--.

Claim 15, Column 28, Lines 7-8, "the one or more video frames," should read --the video frame--.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*